US009229636B2

(12) United States Patent
Tijssen et al.

(10) Patent No.: US 9,229,636 B2
(45) Date of Patent: Jan. 5, 2016

(54) DRAWING SUPPORT TOOL

(75) Inventors: Remon Tijssen, Mill Valley, CA (US); Timothy W. Kukulski, Oakland, CA (US)

(73) Assignee: Adobe Systems Incorporated, San Jose, CA (US)

(*) Notice: Subject to any disclaimer, the term of this patent is extended or adjusted under 35 U.S.C. 154(b) by 946 days.

(21) Appl. No.: 13/038,871

(22) Filed: Mar. 2, 2011

(65) Prior Publication Data
US 2013/0127910 A1 May 23, 2013

Related U.S. Application Data

(60) Provisional application No. 61/406,043, filed on Oct. 22, 2010.

(51) Int. Cl.
*G06F 3/0488* (2013.01)

(52) U.S. Cl.
CPC ........ *G06F 3/04886* (2013.01); *G06F 3/04883* (2013.01)

(58) Field of Classification Search
CPC .................................................. G06T 11/203
See application file for complete search history.

(56) References Cited

U.S. PATENT DOCUMENTS

| | | | |
|---|---|---|---|
| 5,124,693 A * | 6/1992 | Himelstein et al. | 345/427 |
| 5,132,671 A * | 7/1992 | Louis et al. | 345/179 |
| 5,301,267 A | 4/1994 | Hassett et al. | |
| 5,499,366 A | 3/1996 | Rosenberg et al. | |
| 5,572,639 A * | 11/1996 | Gantt | 345/651 |
| 5,577,170 A | 11/1996 | Karow | |
| 5,684,510 A | 11/1997 | Brassell et al. | |
| 5,715,473 A | 2/1998 | Reed | |
| 5,771,042 A * | 6/1998 | Santos-Gomez | 715/800 |
| 5,872,566 A | 2/1999 | Bates et al. | |
| 5,930,408 A | 7/1999 | Seto | |
| 5,943,050 A | 8/1999 | Bullock et al. | |
| 5,956,736 A | 9/1999 | Hanson et al. | |
| 6,005,967 A | 12/1999 | Nakagawa et al. | |
| RE36,704 E | 5/2000 | Parker et al. | |
| 6,377,240 B1 * | 4/2002 | Baudel et al. | 345/157 |
| 6,469,709 B1 * | 10/2002 | Sakai | 345/619 |
| 6,480,813 B1 * | 11/2002 | Bloomquist et al. | 703/1 |
| 6,678,410 B1 | 1/2004 | Phinney et al. | |
| 6,828,971 B2 | 12/2004 | Uesaki et al. | |

(Continued)

OTHER PUBLICATIONS

Characterizing tool use in an interactive drawing environment, Amant et al., 2002.*

(Continued)

*Primary Examiner* — Ming Hon
*Assistant Examiner* — Phong Nguyen
(74) *Attorney, Agent, or Firm* — Wolfe-SBMC

(57) ABSTRACT

A graphical user interface displays a shape. Further, a buffer region that is adjacent to an edge of the shape is displayed at the graphical user interface. In addition, a set of drawing data located within the buffer region is received from a user input device. A first subset of the drawing data that is located in the buffer region at a predetermined distance from the edge and a second subset of the drawing data in the buffer region that is located at a distance from the edge that exceeds the predetermined distance are determined with a processor. Further, the first subset of drawing data is displayed. In addition, the second subset of drawing data is prevented from being displayed at the distance. The process also displays the second subset of drawing data at the predetermined distance.

20 Claims, 32 Drawing Sheets

(56) References Cited

U.S. PATENT DOCUMENTS

| | | |
|---|---|---|
| 6,959,112 B1 | 10/2005 | Wagman |
| 7,034,845 B2 | 4/2006 | Perry et al. |
| 7,058,903 B1 | 6/2006 | Jonach et al. |
| 7,136,067 B2 | 11/2006 | Stamm et al. |
| 7,222,306 B2 | 5/2007 | Kaasila et al. |
| 7,236,174 B2 | 6/2007 | Stamm et al. |
| 7,292,249 B2 | 11/2007 | Stamm et al. |
| 7,437,683 B1 | 10/2008 | Beezer et al. |
| 7,545,392 B2* | 6/2009 | Sprang et al. ............... 345/677 |
| 7,583,267 B2 | 9/2009 | Stamm et al. |
| 7,594,174 B2 | 9/2009 | Truelove et al. |
| 7,684,619 B2 | 3/2010 | Sprang et al. |
| 7,769,819 B2 | 8/2010 | Lerman et al. |
| 8,223,165 B1 | 7/2012 | Jitkoff et al. |
| 8,269,736 B2 | 9/2012 | Wilairat |
| 8,315,473 B1* | 11/2012 | Tao et al. ............... 382/260 |
| 8,386,956 B2 | 2/2013 | Ording et al. |
| 8,416,243 B2 | 4/2013 | Plummer |
| 8,471,856 B2 | 6/2013 | Stamm et al. |
| 8,842,120 B2 | 9/2014 | Tijssen |
| 8,896,621 B1* | 11/2014 | Sipher et al. ............... 345/619 |
| 2001/0024212 A1 | 9/2001 | Ohnishi |
| 2002/0051007 A1 | 5/2002 | Kitagawa et al. |
| 2002/0085018 A1 | 7/2002 | Chien |
| 2003/0038797 A1* | 2/2003 | Vazzana ............... 345/419 |
| 2004/0066393 A1 | 4/2004 | Cragun |
| 2004/0177323 A1 | 9/2004 | Kaasila et al. |
| 2004/0183817 A1 | 9/2004 | Kaasila |
| 2004/0268223 A1 | 12/2004 | Tojo |
| 2005/0012755 A1 | 1/2005 | Dresevic et al. |
| 2005/0062758 A1 | 3/2005 | Kaasila et al. |
| 2005/0162430 A1 | 7/2005 | Stamm et al. |
| 2005/0168476 A1 | 8/2005 | Levene et al. |
| 2005/0188309 A1 | 8/2005 | Tasker et al. |
| 2005/0190187 A1 | 9/2005 | Salesin et al. |
| 2005/0195221 A1* | 9/2005 | Berger et al. ............... 345/660 |
| 2005/0237342 A1 | 10/2005 | Stamm et al. |
| 2006/0017733 A1 | 1/2006 | Matskewich et al. |
| 2006/0022956 A1 | 2/2006 | Lengeling |
| 2006/0048069 A1 | 3/2006 | Igeta |
| 2006/0114258 A1 | 6/2006 | Stamm et al. |
| 2007/0070071 A1 | 3/2007 | Terazono et al. |
| 2007/0097128 A1 | 5/2007 | Lim |
| 2007/0106929 A1* | 5/2007 | Foster et al. ............... 715/502 |
| 2007/0139413 A1 | 6/2007 | Stamm et al. |
| 2007/0139415 A1 | 6/2007 | Stamm et al. |
| 2007/0150834 A1 | 6/2007 | Muller et al. |
| 2007/0157097 A1 | 7/2007 | Peters |
| 2007/0188497 A1 | 8/2007 | Dowling et al. |
| 2007/0189708 A1 | 8/2007 | Lerman et al. |
| 2007/0216689 A1 | 9/2007 | Stamm et al. |
| 2007/0240057 A1 | 10/2007 | Satterfield et al. |
| 2007/0266319 A1 | 11/2007 | Matsuo |
| 2007/0266335 A1 | 11/2007 | Zielinski et al. |
| 2007/0268273 A1 | 11/2007 | Westerman et al. |
| 2007/0273668 A1 | 11/2007 | Park et al. |
| 2008/0012862 A1 | 1/2008 | Duggan et al. |
| 2008/0024500 A1* | 1/2008 | Bae ............... 345/442 |
| 2008/0034317 A1 | 2/2008 | Fard et al. |
| 2008/0097621 A1 | 4/2008 | Tasker et al. |
| 2008/0165193 A1 | 7/2008 | Stamm et al. |
| 2008/0229238 A1 | 9/2008 | Young |
| 2008/0238916 A1* | 10/2008 | Ghosh et al. ............... 345/419 |
| 2008/0238922 A1 | 10/2008 | Rhodes et al. |
| 2008/0244410 A1 | 10/2008 | Schormann |
| 2008/0294974 A1 | 11/2008 | Nurmi et al. |
| 2008/0301547 A1* | 12/2008 | Karunakaran et al. ........ 715/244 |
| 2009/0184980 A1 | 7/2009 | Mansfield |
| 2009/0288043 A1 | 11/2009 | Willis |
| 2009/0295826 A1 | 12/2009 | Good et al. |
| 2009/0303178 A1 | 12/2009 | Koda et al. |
| 2010/0013862 A1* | 1/2010 | Gershfeld ............... 345/677 |
| 2010/0056221 A1 | 3/2010 | Park |
| 2010/0058226 A1 | 3/2010 | Flake et al. |
| 2010/0058228 A1 | 3/2010 | Park |
| 2010/0088632 A1 | 4/2010 | Knowles et al. |
| 2010/0162151 A1 | 6/2010 | Class et al. |
| 2010/0214257 A1 | 8/2010 | Wussler et al. |
| 2010/0271404 A1 | 10/2010 | Marr |
| 2010/0278504 A1 | 11/2010 | Lyons et al. |
| 2010/0313154 A1 | 12/2010 | Choi et al. |
| 2010/0318908 A1 | 12/2010 | Neuman et al. |
| 2011/0025719 A1 | 2/2011 | Yanase |
| 2011/0069085 A1 | 3/2011 | Weber et al. |
| 2011/0072344 A1 | 3/2011 | Harris et al. |
| 2011/0116769 A1 | 5/2011 | Suglyama et al. |
| 2011/0122159 A1 | 5/2011 | Bergsten et al. |
| 2011/0138313 A1 | 6/2011 | Decker et al. |
| 2011/0157029 A1 | 6/2011 | Tseng |
| 2011/0167349 A1 | 7/2011 | Samra et al. |
| 2011/0175821 A1* | 7/2011 | King ............... 345/173 |
| 2011/0181521 A1 | 7/2011 | Reid et al. |
| 2011/0181617 A1 | 7/2011 | Tsuda et al. |
| 2011/0197124 A1 | 8/2011 | Garaventa |
| 2011/0197153 A1 | 8/2011 | King et al. |
| 2011/0246916 A1 | 10/2011 | Leskelä et al. |
| 2011/0302532 A1 | 12/2011 | Missig |
| 2011/0314424 A1 | 12/2011 | Gusmorino et al. |
| 2012/0017153 A1 | 1/2012 | Matsuda et al. |
| 2012/0017163 A1 | 1/2012 | Ragan |
| 2012/0042272 A1 | 2/2012 | Hong et al. |
| 2012/0092340 A1* | 4/2012 | Sarnoff et al. ............... 345/420 |
| 2012/0110438 A1 | 5/2012 | Peraza et al. |
| 2012/0198330 A1 | 8/2012 | Koppel et al. |
| 2012/0210222 A1 | 8/2012 | Matsuda et al. |
| 2012/0313865 A1* | 12/2012 | Pearce ............... 345/173 |
| 2013/0097502 A1 | 4/2013 | Langmacher et al. |
| 2013/0127867 A1 | 5/2013 | Tijssen et al. |
| 2013/0127878 A1 | 5/2013 | Tijssen |
| 2013/0132878 A1 | 5/2013 | Tijssen |
| 2013/0132888 A1 | 5/2013 | Tijssen |
| 2013/0132907 A1 | 5/2013 | Kukulski et al. |
| 2013/0145268 A1 | 6/2013 | Kukulski |
| 2013/0145270 A1 | 6/2013 | Piran et al. |
| 2014/0088926 A1* | 3/2014 | Rhoades et al. ............... 703/1 |
| 2015/0199073 A1 | 7/2015 | Kukulski et al. |

OTHER PUBLICATIONS

"Surface by Microsoft, Pre-Order the New Windows Tablet", retrieved from <http://www.microsoft.com/surface/en-US> on Oct. 17, 2012, 5 pages.

"Final Office Action", U.S. Appl. No. 13/039,023, (Oct. 11, 2013), 22 pages.

"Final Office Action", U.S. Appl. No. 13/309,924, (Sep. 25, 2013), 17 pages.

"Fontlab Fontographer 5", Fontlab, Ltd., (Jun. 2010), 525 pages.

"Non-Final Office Action", U.S. Appl. No. 12/901,799, (Sep. 16, 2013), 22 pages.

"Non-Final Office Action", U.S. Appl. No. 13/039,081, (Oct. 11, 2013), 14 pages.

Deneba Systems Inc., "Canvas Tips and Techniques," published online, 2002, pp. 5-6.

"thePhotoFinishes Corel Draw X4 Suite," p. 5.

Bain, Steve, "Cool Tricks with Paragraph Text in CorelDRAW," published online, 2010.

"Final Office Action", U.S. Appl. No. 13/225,203, (Aug. 29, 2013), 10 pages.

"Non-Final Office Action", U.S. Appl. No. 12/893,669, (Sep. 12, 2013), 14 pages.

"Non-Final Office Action", U.S. Appl. No. 13/039,023, (Jul. 9, 2013), 19 pages.

"Non-Final Office Action", U.S. Appl. No. 13/225,203, (Apr. 12, 2013), 12 pages.

"Non-Final Office Action", U.S. Appl. No. 13/309,924, (Mar. 1, 2013), 19 pages.

"Adobe PostScript", Available at <http://www.signwarehouse.com/tech-support/manuals/Laser%20Master.pdf>, 2006, 181 pages.

"Final Office Action", U.S. Appl. No. 12/901,799, Feb. 7, 2014, 23 pages.

(56) References Cited

OTHER PUBLICATIONS

"Final Office Action", U.S. Appl. No. 13/039,081, Feb. 24, 2014, 16 pages.
"Non-Final Office Action", U.S. Appl. No. 12/893,669, Apr. 21, 2014, 15 pages.
"Non-Final Office Action", U.S. Appl. No. 13/039,023, Jan. 31, 2014, 33 pages.
"Non-Final Office Action", U.S. Appl. No. 13/225,203, Mar. 20, 2014, 12 pages.
"Non-Final Office Action", U.S. Appl. No. 13/339,367, Dec. 26, 2013, 21 pages.
"Notice of Allowance", U.S. Appl. No. 13/039,081, May 15, 2014, 4 pages.
"TrueType 1.0 Font Files", Technical Specification, Revision 1.66, Aug. 1995, 408 pages.
"Final Office Action", U.S. Appl. No. 12/893,669, Oct. 16, 2014, 17 pages.
"Non-Final Office Action", U.S. Appl. No. 13/339,367, Dec. 16, 2014, 21 pages.
"Final Office Action", U.S. Appl. No. 13/039,023, Jul. 3, 2014, 43 pages.
"Final Office Action", U.S. Appl. No. 13/225,203, Aug. 28, 2014, 16 pages.
"Final Office Action", U.S. Appl. No. 13/339,367, Jul. 3, 2014, 19 pages.
"Non-Final Office Action", U.S. Appl. No. 12/901,799, Sep. 16, 2014, 16 pages.
"Non-Final Office Action", U.S. Appl. No. 13/309,924, Jul. 3, 2014, 14 pages.
"SolidWorks Help—Highlighting", Retrieved from <http://help.solidworks.com/2012/English/SolidWorks/sldworks/c_Highlighting.htm> in Sep. 16, 2014, 2012, 2 pages.
"Better editing with custom screen layouts", Retrieved from <https://digitalfilms.wordpress.com/2010/06/18/> on Jan. 30, 2015, Jun. 18, 210, 7 pages.
"Final Office Action", U.S. Appl. No. 12/901,799, Mar. 25, 2015, 18 pages.
"Final Office Action", U.S. Appl. No. 13/309,924, Jan. 29, 2015, 16 pages.
"Final Office Action", Application No. 13/339,367, Apr. 23, 2015, 22 pages.
"Non-Final Office Action", U.S. Appl. No. 12/893,669, Mar. 25, 2015, 20 pages.
Hauptmann,"Artificial Intelligence Techniques in the Interface to a Digital Video Library", CHI '97 Extended Abstracts on Human Factors in Computing Systems, Mar. 1997, 6 pages.
"Final Office Action", U.S. Appl. No. 12/893,669, Aug. 11, 2015, 17 pages.
"Advisory Action", U.S. Appl. No. 13/339,367, Oct. 21, 2015, 3 pages.

* cited by examiner

DRAWING SUPPORT TOOL

RELATED APPLICATIONS

This application claims priority to U.S. Provisional Patent Application No. 61/406,043, entitled Drawing Support Tool, filed on Oct. 22, 2010, the content of which is hereby incorporated by reference in its entirety.

BACKGROUND

1. Field

This disclosure generally relates to freeform drawing. More particularly, the disclosure relates to freeform drawing with edge detection.

2. General Background

Systems have been developed to allow users to draw various types of drawings. These systems vary in complexity so that a user ranging from the leisure artist to the professional developer has the tools that will be helpful in his or her artistic ventures.

Some of these systems allow a user to perform freeform drawing. The freeform drawing tool may be useful to a leisure or professional user. However, current freeform drawing tools are limited in their abilities. The user is not provided with enough supportive functionality to encapsulate the benefits of freeform drawing.

Further, in the physical world, a user can place a pen against an edge of a support tool such as a ruler. The user receives haptic feedback as a result of whether the pen is against the edge or not. However, in the virtual world, haptic feedback is currently not provided for support drawing tools. Accordingly, a user may have difficulty lining up an edge of a support drawing tool with a virtual pen.

SUMMARY

In one aspect of the disclosure, a computer program product is provided. The computer program product includes a computer useable medium having a computer readable program. The computer readable program when executed on a computer causes the computer to display, at a graphical user interface, a shape. Further, the computer readable program when executed the computer causes the computer to display, at the graphical user interface, a buffer region that is adjacent to an edge of the shape. In addition, the computer readable program when executed the computer causes the computer to receive, from an input device, a set of drawing data located within the buffer region. The computer readable program when executed the computer also causes the computer to determine, with a processor a first subset of the drawing data that is located in the buffer region at a predetermined distance from the edge and a second subset of the drawing data in the buffer region that is located at a distance from the edge that exceeds the predetermined distance. Further, the computer readable program when executed the computer causes the computer to display the first subset of drawing data. In addition, the computer readable program when executed the computer causes the computer to prevent the second subset of drawing data from being displayed at the distance. The computer readable program when executed the computer also causes the computer to display the second subset of drawing data at the predetermined distance.

In another aspect of the disclosure, a process is provided. The process displays, at a graphical user interface, a shape. Further, the process displays, at the graphical user interface, a buffer region that is adjacent to an edge of the shape. In addition, the process receives, from an input device, a set of drawing data located within the buffer region. The process also determines, with a processor a first subset of the drawing data that is located in the buffer region at a predetermined distance from the edge and a second subset of the drawing data in the buffer region that is located at a distance from the edge that exceeds the predetermined distance. Further, the process displays the first subset of drawing data. In addition, the process prevents the second subset of drawing data from being displayed at the distance. The process also displays the second subset of drawing data at the predetermined distance.

In yet another aspect of the disclosure, a system is provided. The system includes an input device that receives freeform drawing data from a user. Further, the system includes a graphical user interface that displays a shape and a buffer region that is adjacent to an edge of the shape. In addition, the system includes an input device that receives a set of drawing data located within the buffer region. The system also includes a processor that (i) determines a first subset of the drawing data that is located in the buffer region at a predetermined distance from the edge and a second subset of the drawing data in the buffer region that is located at a distance from the edge that exceeds the predetermined distance, (ii) provides the first subset of drawing data to the graphical user interface to be displayed, (iii) prevents the second subset of drawing data from being displayed at the distance, and (iv) displays the second subset of drawing data at the predetermined distance.

DRAWINGS

The above-mentioned features of the present disclosure will become more apparent with reference to the following description taken in conjunction with the accompanying drawings wherein like reference numerals denote like elements and in which.

DETAILED DESCRIPTION

An edge detection method, system, and computer program product are provided to expand the abilities of computerized freeform stencil drawing for a user. In one embodiment, a shape is provided on a graphical user interface ("GUI") to allow the user to restrict the freeform drawing based on the shape. The shape may be any type of polygon, symbol, etc. In one embodiment, the shape is predefined. For example, a computer system may have a predefined shape for user by the user. Alternatively, the computer system may have a plurality of shapes from which the user may choose. In another embodiment, the shape is defined by the user. The user may draw a shape, select a shape, etc. for use with freeform drawing. Further, the user may be given one or more user controls for the shape. For example, the user may change the size of the shape, the color of the shape, etc.

Figure 1:
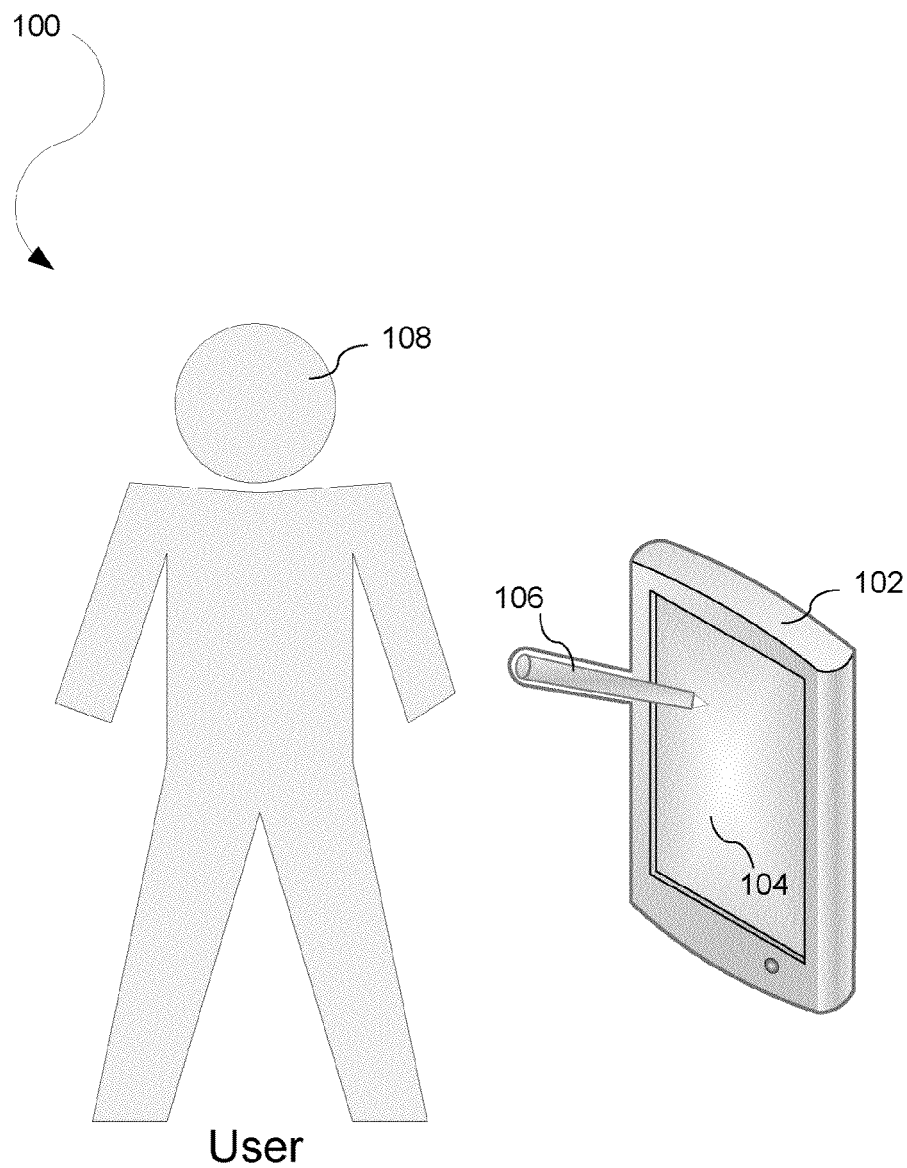
FIG. 1 illustrates a computing environment that may be utilized for edge detection with freeform drawing.

FIG. 1 illustrates a computing environment 100 that may be utilized for edge detection with freeform drawing. A computing device 102 has a GUI 104. An input device 106 receives freeform drawing data from a user 108. The computing device 102 may be any device with a processor such as a computer tablet, personal computer, laptop, notebook, cell phone, smart phone, personal digital assistant, personal medial player, set top box, etc. The computing device 102 is illustrated as a tablet only for illustrative purposes. Further, the input device 106 may be any device that sends data, directly or indirectly, for display on the GUI 104. For example, the input device 106 may be a computerized pen, computer mouse, touch screen, keyboard, stylus, etc. The input device 106 is illustrated as a computerized pen only for illustrative purposes. The input device 106 may be wireless or may have a hard wire connection to the computing device 102 and/or the GUI 104.

Figure 2A:
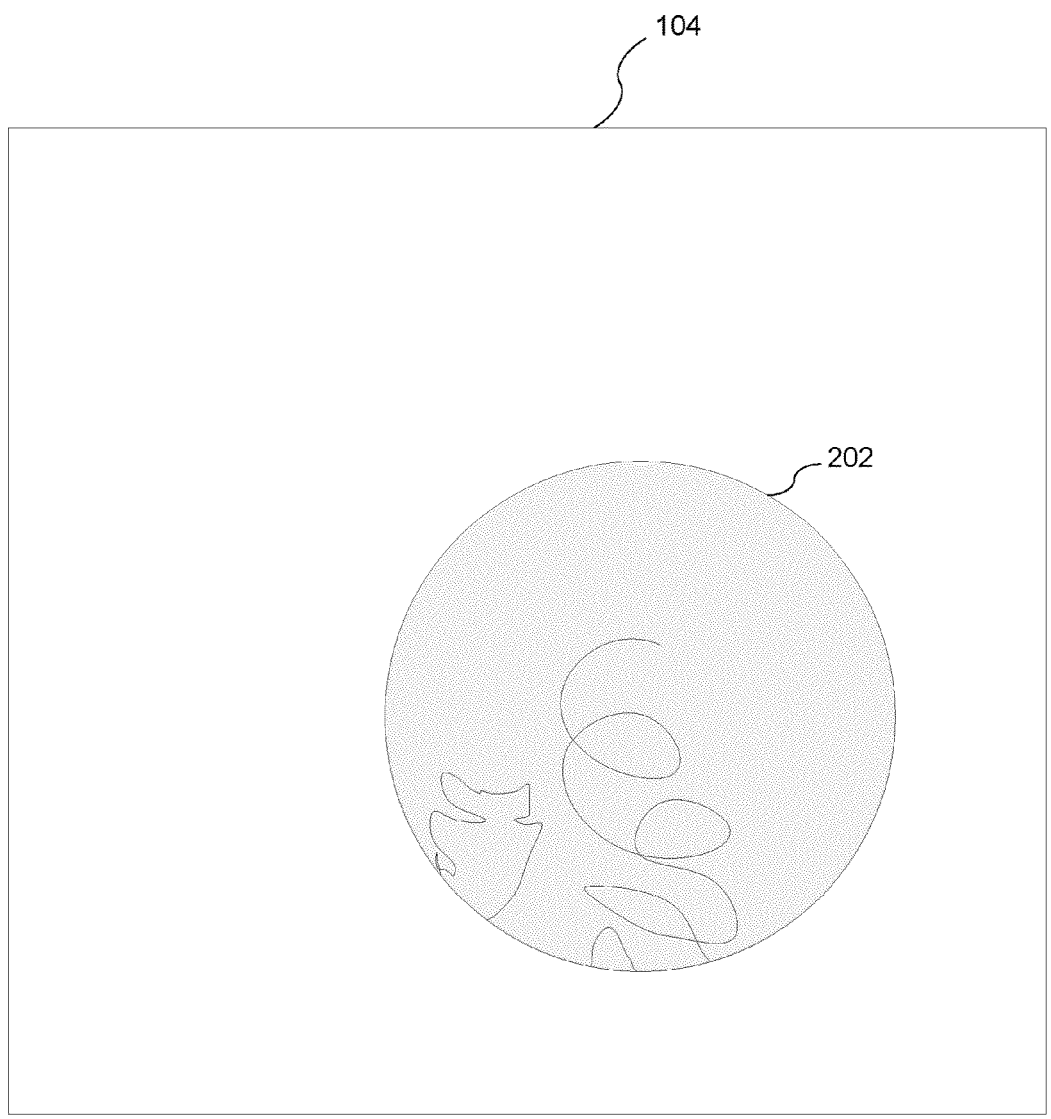
FIG. 2A illustrates an example of a circular shape that may be utilized by the user to restrict freeform drawing to being inside of the circular shape.

FIG. 2A illustrates an example of a circular shape 202 that may be utilized by the user to restrict freeform drawing to being inside of the circular shape 202. In one embodiment, the circular shape 202 is located in a fixed position within the GUI 104. The user may then draw inside and/or outside of the circular shape 202. In one configuration, any freeform drawing performed by the user inside of the circular shape 202 is displayed and any freeform drawing performed outside of the circular shape 202 is not displayed. Further, the edge detection may be automatically determined by a processor. In other words, the freeform drawing data received by the input device 106 may be a set of data that includes an edge touching subset, i.e., a portion, of the freeform drawing data that touches one or more edges of the circular shape 202 and an edgeless subset, i.e., a portion, of the freeform drawing data that does not touch any edge of the circular shape 202. An edgeless subset of freeform drawing data that is within a predetermined region with respect to each edge of the circular shape, e.g., inside of the circular shape 202, without touching an edge of the circular shape 202 is displayed whereas an edge touching subset of freeform drawing data that touches an edge is not displayed. Further, in one configuration, an edgeless subset that is drawn within an additional predetermined region that is distinct from the predetermined region, i.e., outside of the circular shape 202, is not displayed. The predetermined region may be inside, outside, or a different orientation with respect to the circular shape 202. Further, the additional predetermined region may be inside, outside, or a different orientation with respect to the circular shape 202 so long as the additional predetermined region is different than the predetermined region. In one embodiment, the predetermined region and the additional predetermined region do not share any pixels. In an alternative embodiment, the predetermined region and the additional predetermined region share one or more pixels and do not share one or more pixels.

In one embodiment, the shape is selected by the user from a predefined set of shapes. In another embodiment, the user freeform draws the shape and that resulting shape is utilized as the shape. In yet another embodiment, the shape may be scaled and/or rotated.

Figure 2B:
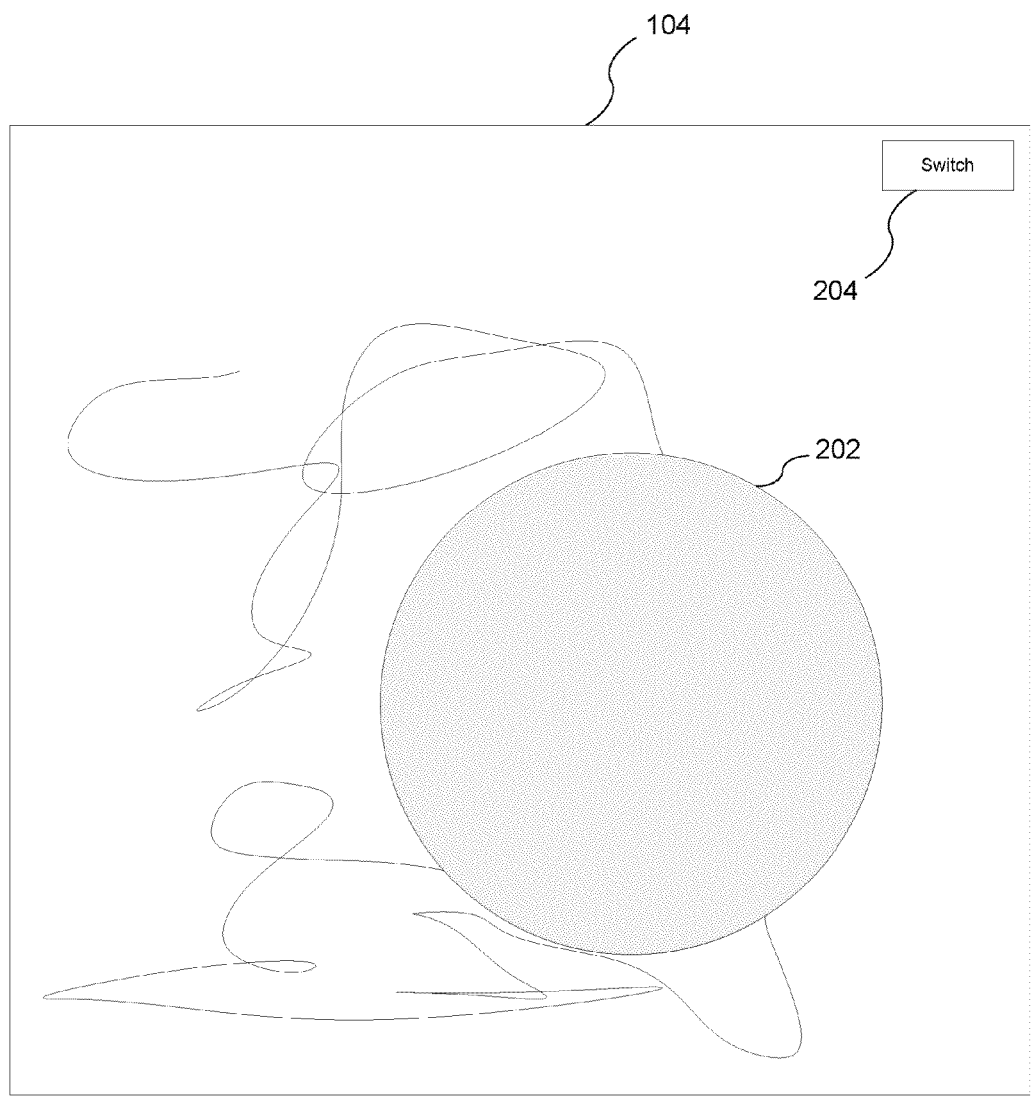
FIG. 2B illustrates an example of an alternative configuration any freeform drawing performed by the user outside of the circular shape is displayed and any freeform drawing performed inside the circular shape is not displayed.

FIG. 2B illustrates an example of an alternative configuration any freeform drawing performed by the user outside of the circular shape 202 is displayed and any freeform drawing performed inside the circular shape 202 is not displayed. In other words, the subset of freeform drawing data that is outside of the circular shape 202 without touching an edge of the circular shape 202 is displayed whereas the subset of freeform drawing data that touches an edge is not displayed. Further, in one configuration, a subset that goes beyond the edge inside of the circular shape 202 is not displayed.

In one embodiment, the user may draw on the edge itself, but that freeform drawing data will be repositioned in a predefined position relative to the edge in the graphical user interface. For example, if the user is drawing outside of the circular shape 202 in FIG. 2B and draws a line on the edge of the circle, that line will be snapped to just outside of the edge. In one embodiment, just outside the edge may be the first empty pixels that are just outside the edge or the first available pixels within a small range of pixels so that the line is drawn visibly next to the edge. In another embodiment, the user may draw on the edge itself, but that freeform drawing data will be ignored.

In another embodiment, the user may draw in an additional predetermined region other than the predetermined region, but that freeform drawing data will be repositioned in a predefined position relative to an edge in the graphical user interface. For example, if the user initiates drawing outside of the circular shape 202 in FIG. 2B and draws a line from the inside of the edge to the center of the circular shape 202, that line will not be displayed within the circular shape 202, but rather will be displayed outside of the circular shape 202. The line may be snapped to just outside the edge or the first available pixels within a small range of pixels so that the line is drawn visibly next to the edge. In another embodiment, the user may draw within the circular shape 202, but that freeform drawing data will be ignored.

In yet another embodiment, the user may both draw on the edge itself and in the additional predetermined region so that the freeform drawing data is snapped to a position relative to the shape in which freeform drawing data may be displayed. If freeform drawing data is allowed on the outside of the shape, the freeform drawing data on the edge or within the shape is snapped to the outside of the shape. If freeform drawing data is allowed on the inside of the shape, the freeform drawing data on the edge or outside of the shape is snapped to the inside of the shape.

In any of the configurations provided herein, a feature may allow for a user to freeform draw on the stencil shape edge so that the freeform drawing is displayed on the edge. This feature may be predefined or user-defined. In another embodiment, this feature may be enabled or disabled by the user.

In one embodiment, the user is provided with a switch 204 to change the manner in which the freeform drawing is restricted. For example, the switch may initially be configured to restrict the user from drawing outside of the circular shape 202. The user may proceed with drawing to have some freeform drawing within the circular shape 202. Further, the user 108 may then choose to change the switch 204 so that freeform drawing is performed outside of the circular shape 202. As a result, the user may have a drawing with some freeform drawing inside of and some freeform drawing outside of the circular shape 202. In one embodiment, the system may autodetect inside the shape drawing or outside the shape drawing by determining the start position of the drawing. For example, if the user starts drawing at a position inside the shape, the user may indicate that he or she would like the system to perform inside the shape drawing whereas if the user starts drawing at a location outside of the shape, the user may indicate that he or she would like the system to perform outside of the shape drawing.

Figure 3A:
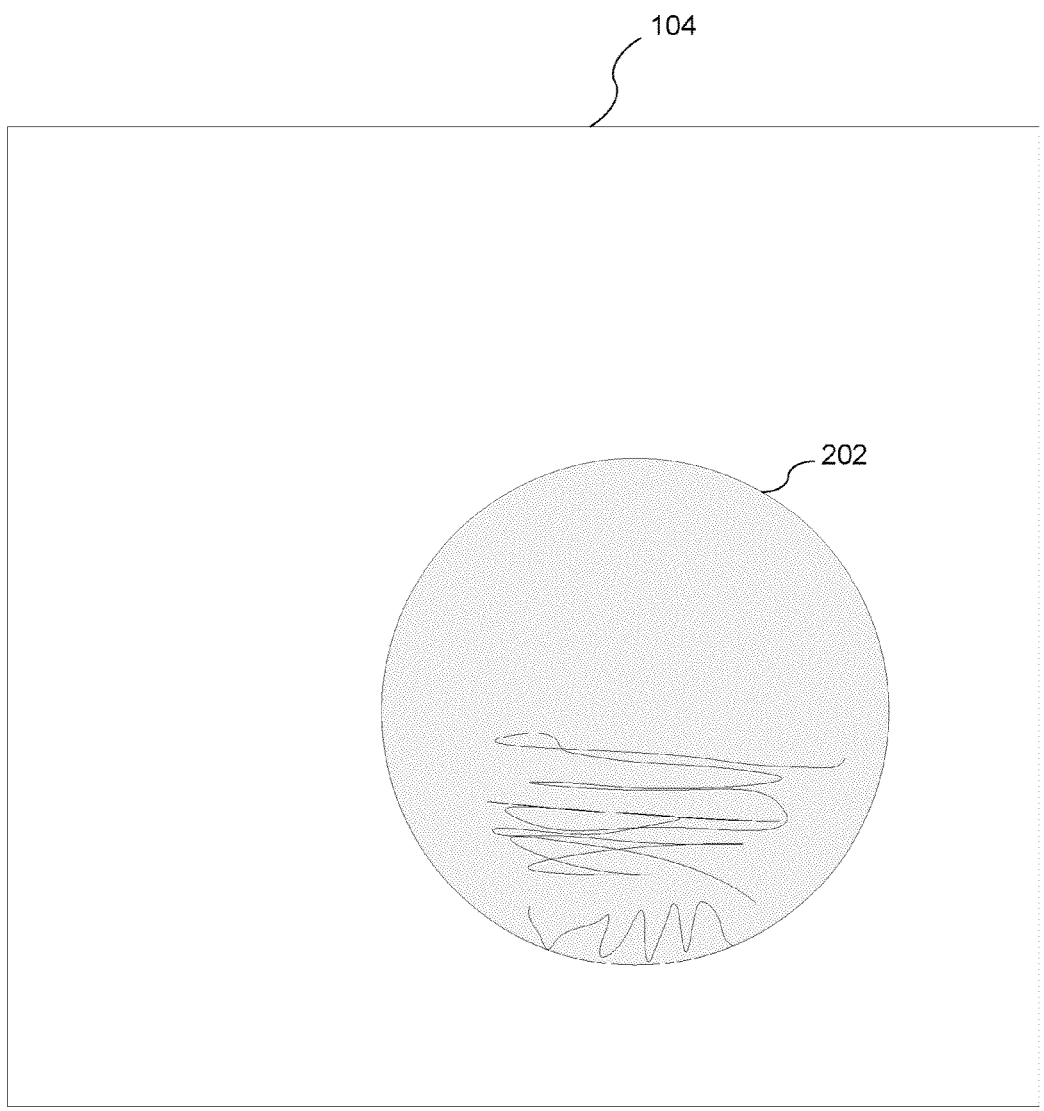
FIG. 3A illustrates the circular shape located in a first position in the GUI.
Figure 3B:
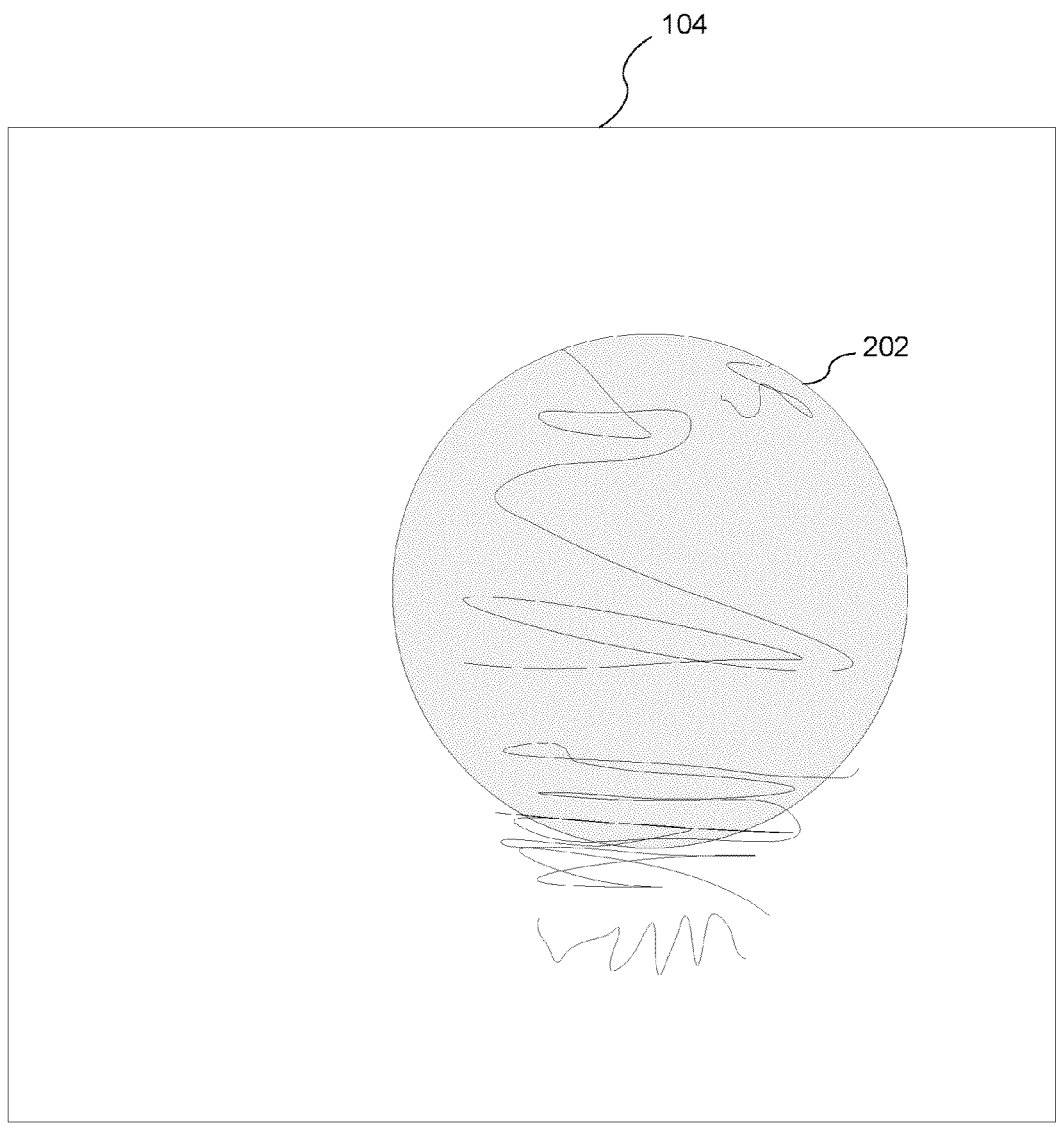
FIG. 3B illustrates the circular shape located at a second position in the GUI as the circular shape moved from the first position to the second position.

FIGS. 3A and 3B illustrate a configuration in which the shape is mobile. FIG. 3A illustrates the circular shape 202 located in a first position in the GUI 104. The user draws inside of the circular shape 202, and the freeform drawing data within the circular shape 202 is displayed without displaying freeform drawing data outside of the circular shape 202. FIG. 3B illustrates the circular shape 202 located at a second position in the GUI 104 as the circular shape 202 moved from the first position to the second position. The freeform drawing that was previously inside the circular shape 202 at the first position, but now outside the circular shape 202 at the second position, is still displayed. Further, any new freeform drawing data that occurs outside of the circular shape 202 at the time that the circular shape 202 is located at the second position is not displayed.

In one embodiment, the switch 204 may be utilized with the mobile shape. In other words, the user may choose to switch back and forth between restricting inside and outside freeform drawing.

In another embodiment, the mobile shape may move automatically. The speed of movement may be changed by the user. In one embodiment, the shape may be scaled, rotated, and/or repositioned simultaneously while drawing. In yet another embodiment, the user moves the mobile shape through a user input. In one embodiment, the movement is an animation. For example, the animation may be a path of the circular shape moving around the GUI 104. The animation may be custom defined by the user or predefined. In one embodiment, a user that would like to draw a pattern may do so with the assistance of the animated shape.

Figure 4:
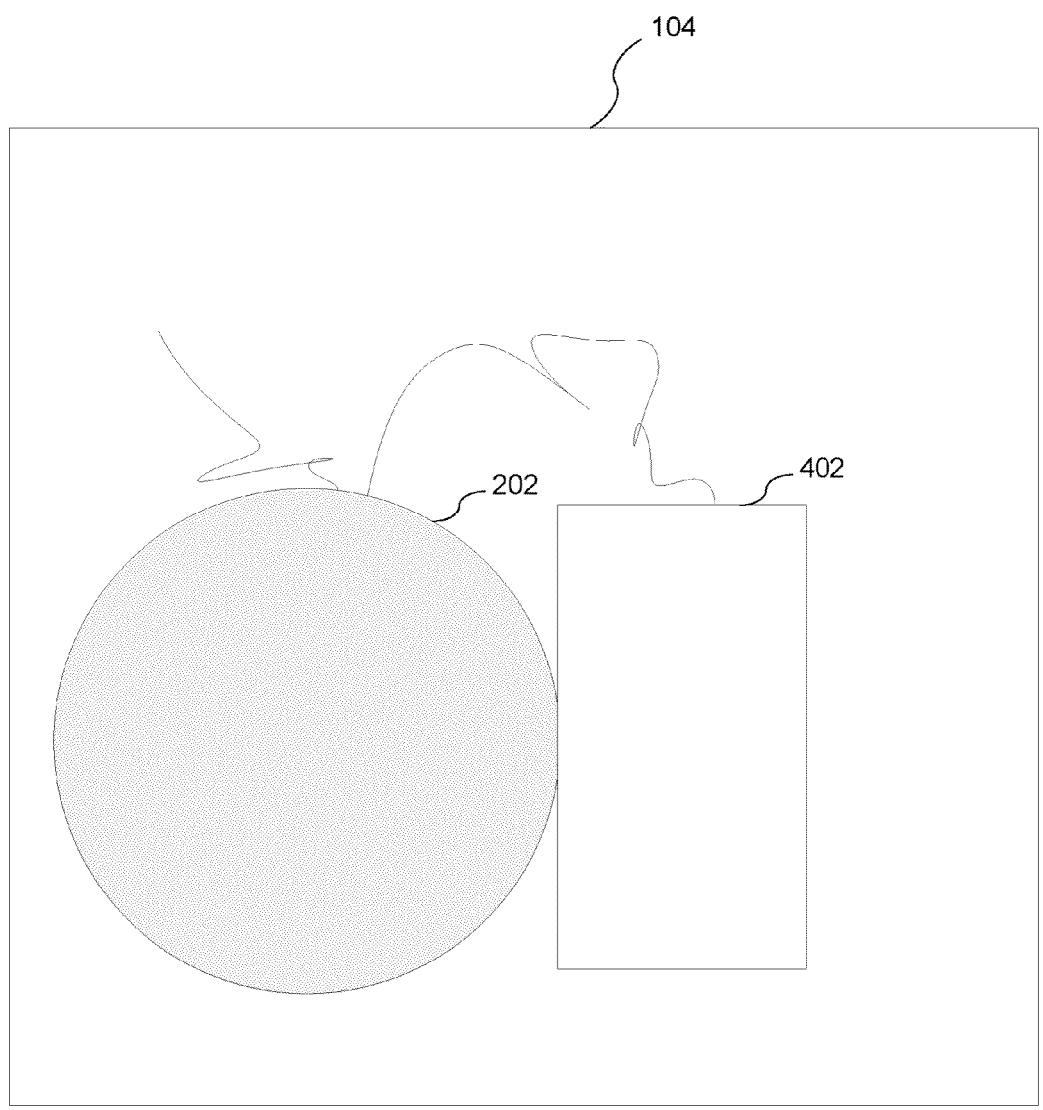
FIG. 4 illustrates an example of edge detection performed with a combination of shapes.

The edge detection described herein is not limited to any particular kind of shape. Further, the edge detection is not limited to any particular quantity of shapes. FIG. 4 illustrates an example of edge detection performed with a combination of shapes. As an example, the circular shape 202 illustrated in FIGS. 2A and 2B is utilized along with a rectangular shape 402. Any freeform drawing data drawn outside of the combination of these two shapes is displayed while any freeform drawing data drawn within these two shapes is not display in this example. As described herein, this configuration may be utilized with drawing on the inside, a switch, etc. In one embodiment, multiple shapes may be utilized to overlap so as to create a custom stencil shape.

With any of the configurations described herein, brush properties may change when an edge is detected. As an example, a drawing may be shown only when an edge is detected. Further, the visual appearance of the brush, e.g., brush size, brush color, brush opacity, brush type, or the like, may change when an edge is detected. For example, the edge may change from blue to red when an edge is touched.

Further, any of the configurations described herein may be utilized with a multi-touch based input device. An example of a touch based input device is a touch screen. The user is able to draw with his or her fingers. In one embodiment, different properties may be assigned to different fingers for a touch based input device. For example, if one finger is inside the edge, the system is configured to stop displaying freeform drawing data if the user's finger touches the edge and moves beyond the edge. The system may also be configured so that another finger of the user corresponds to displaying data outside of the edge so that if the user's finger touches the edge and moves inside the edge, that particular freeform drawing data for that finger is not displayed. Further, one hand may be utilized to touch the GUI 104 to move, size, and/or shape the drawing stencil in the GUI 104 while the other hand is utilized to touch the GUI 104 to perform freeform drawing.

Figure 5:
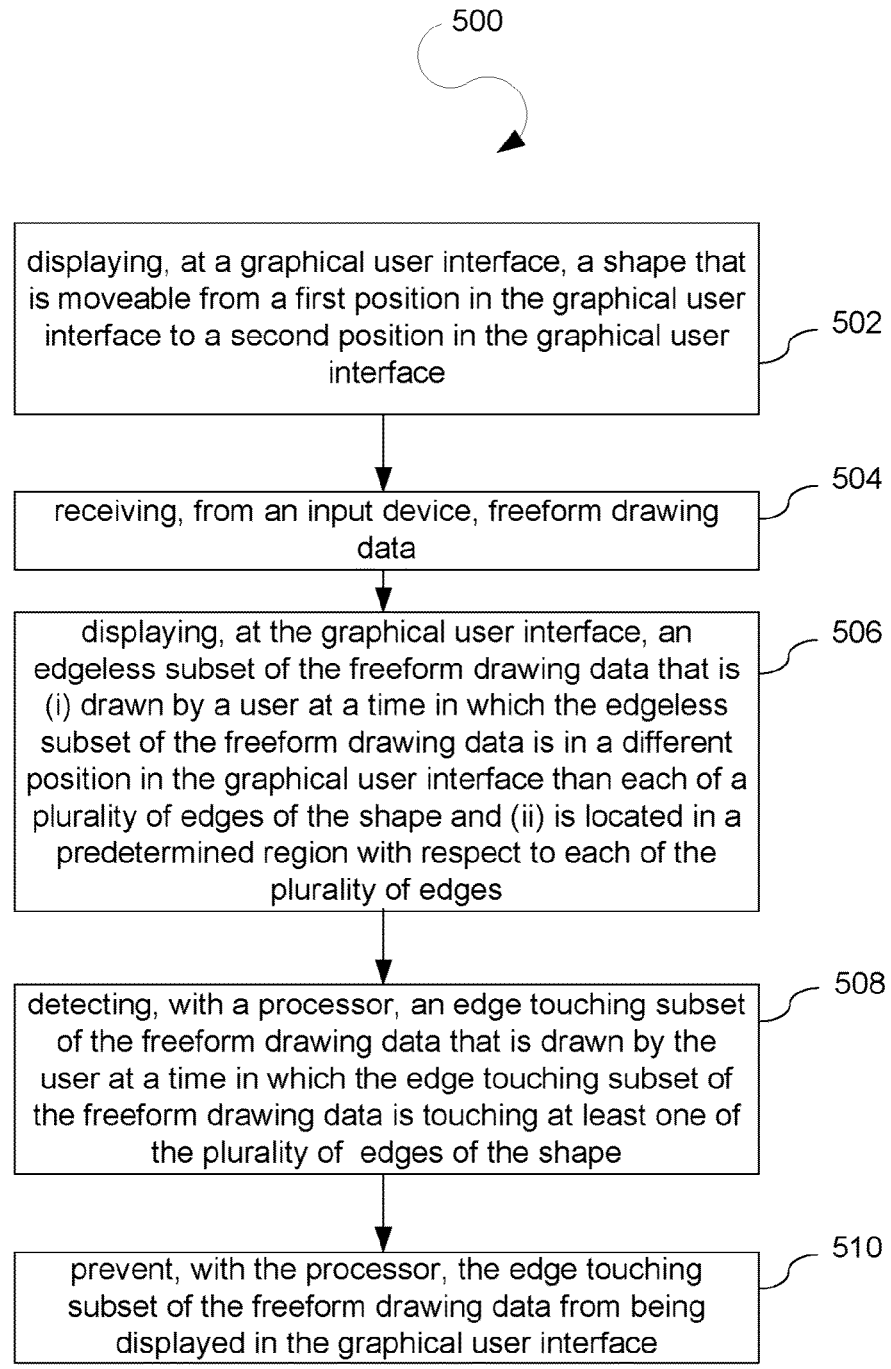
FIG. 5 illustrates a process that may be utilized to perform edge detection with freeform drawing.

FIG. 5 illustrates a process 500 that may be utilized to perform edge detection with freeform drawing. At a process block 502, the process 500 displays, at a graphical user interface, a shape that is moveable from a first position in the graphical user interface to a second position in the graphical user interface. Further, at a process block 504, the process 500 receives, from an input device, freeform drawing data. In addition, at a process block 506, the process 500 displays, at the graphical user interface, an edgeless subset of the freeform drawing data that is (i) drawn by a user at a time in which the edgeless subset of the freeform drawing data is in a different position in the graphical user interface than each of a plurality of edges of the shape and (ii) is located in a predetermined region with respect to each of the plurality of edges. The edgeless subset of the freeform drawing data is freeform drawing data that does not touch an edge of the shape. At a process block 508, the process 500 also detects, with a processor, an edge touching subset of the freeform drawing data that is drawn by the user at a time in which the edge touching subset of the freeform drawing data is touching at least one of the plurality of edges of the shape. Further, at a process block 510, the process 500 prevents, with the processor, the edge touching subset of the freeform drawing data from being displayed in the graphical user interface.

Figure 6:
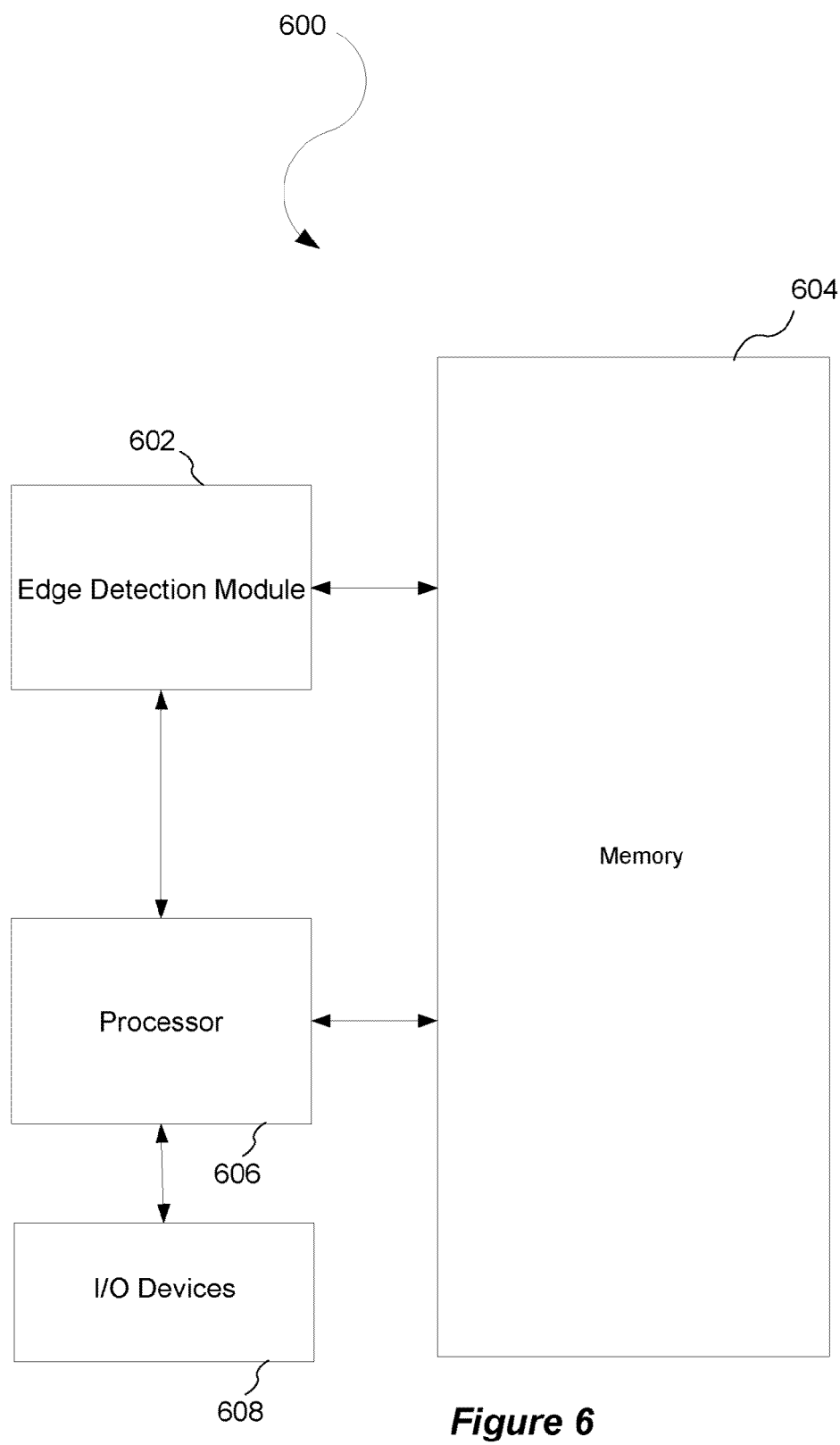
FIG. 6 illustrates a system configuration that may be utilized for edge detection with freeform drawing.

FIG. 6 illustrates a system configuration 600 that may be utilized for edge detection with freeform drawing. In one embodiment, an edge detection module 602 interacts with a memory 604. In one embodiment, the system configuration 600 is suitable for storing and/or executing program code and is implemented using a general purpose computer or any other hardware equivalents. The processor 606 is coupled, either directly or indirectly, to the memory 604 through a system bus. The memory 604 can include local memory employed during actual execution of the program code, bulk storage, and/or cache memories which provide temporary storage of at least some program code in order to reduce the number of times code must be retrieved from bulk storage during execution.

The Input/Output ("I/O") devices 608 can be coupled directly to the system configuration 600 or through intervening input/output controllers. Further, the I/O devices 608 may include a keyboard, a keypad, a mouse, a microphone for capturing speech commands, a pointing device, and other input devices that will be recognized by one of ordinary skill in the art. Further, the I/O devices 608 may include output devices such as a printer, display screen, or the like. Further, the I/O devices 608 may include a receiver, transmitter, speaker, display, image capture sensor, biometric sensor, etc. In addition, the I/O devices 608 may include storage devices such as a tape drive, floppy drive, hard disk drive, compact disk ("CD") drive, etc.

Network adapters may also be coupled to the system configuration 600 to enable the system configuration 600 to become coupled to other systems, remote printers, or storage devices through intervening private or public networks. Modems, cable modems, and Ethernet cards are just a few of the currently available types of network adapters.

Figure 7:
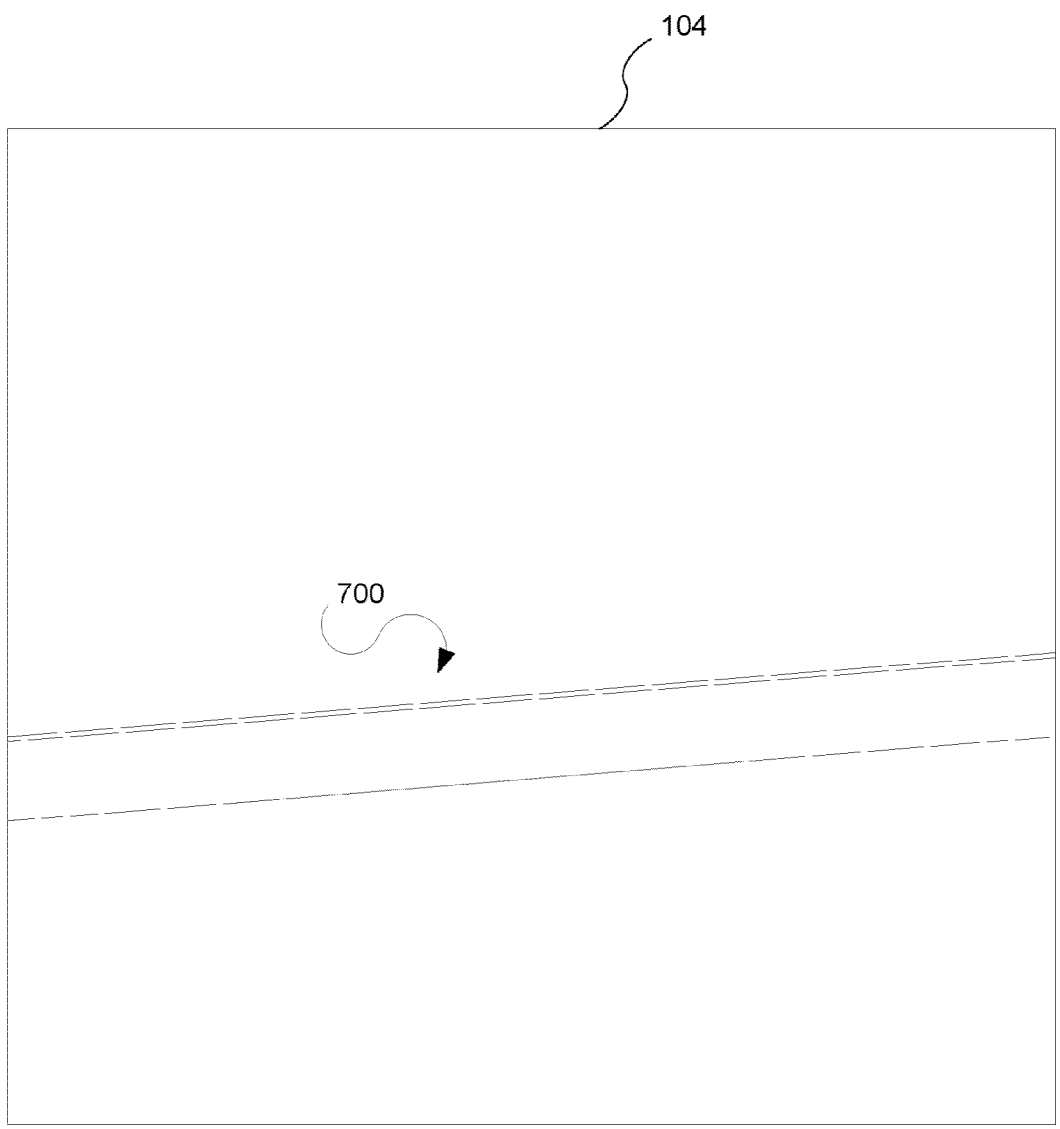
FIG. 7 illustrates a drawing support tool positioned within the GUI.

FIG. 7 illustrates a drawing support tool 700 positioned within the GUI 104. The drawing support tool is a mechanism that allows a user to interact with a virtual straight edge to enable natural and streamline interaction. The drawing support tool may be utilized on a touch enabled device or a computing device that is not touch enabled.

Figure 8A:
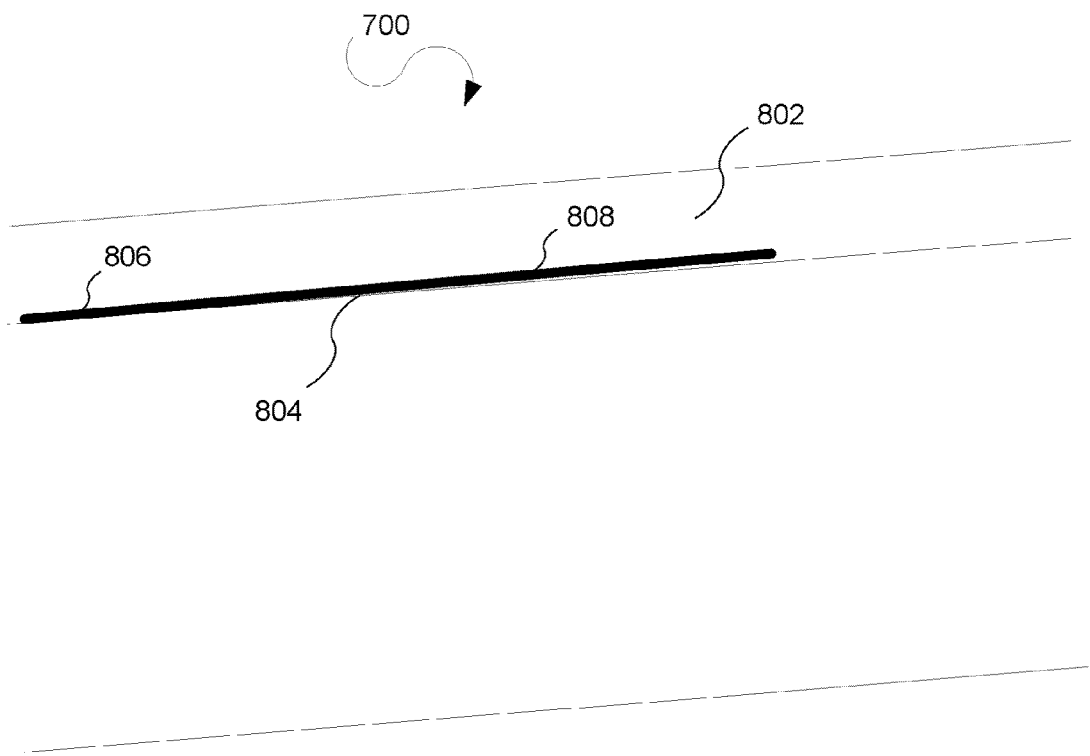
FIG. 8A illustrates an enlarged view of the drawing support tool illustrated in FIG. 7.

FIG. 8A illustrates an enlarged view of the drawing support tool 700 illustrated in FIG. 7. The drawing support tool 700 has a buffer region 802, which is adjacent to an edge 804 of the shape 700. The user has inputted a set of drawing data to attempt to draw a straight line against the edge 804 of the drawing support tool 700. The user successfully draws a first portion 806 of the set of drawing data as a straight line, but unsuccessfully draws a straight line for the second portion 808 of the drawing data against the edge 804. As an example, a certain measure of data such as a number of pixels, vectors, etc. may be utilized to determine a predetermined distance. If a portion of drawing data is within the predetermined distance within the buffer region, the drawing data is displayed. However, if a portion of drawing data exceeds the predetermined distance within the buffer region, the drawing data is not displayed, but is rather snapped to the predetermined distance.

Figure 8B:
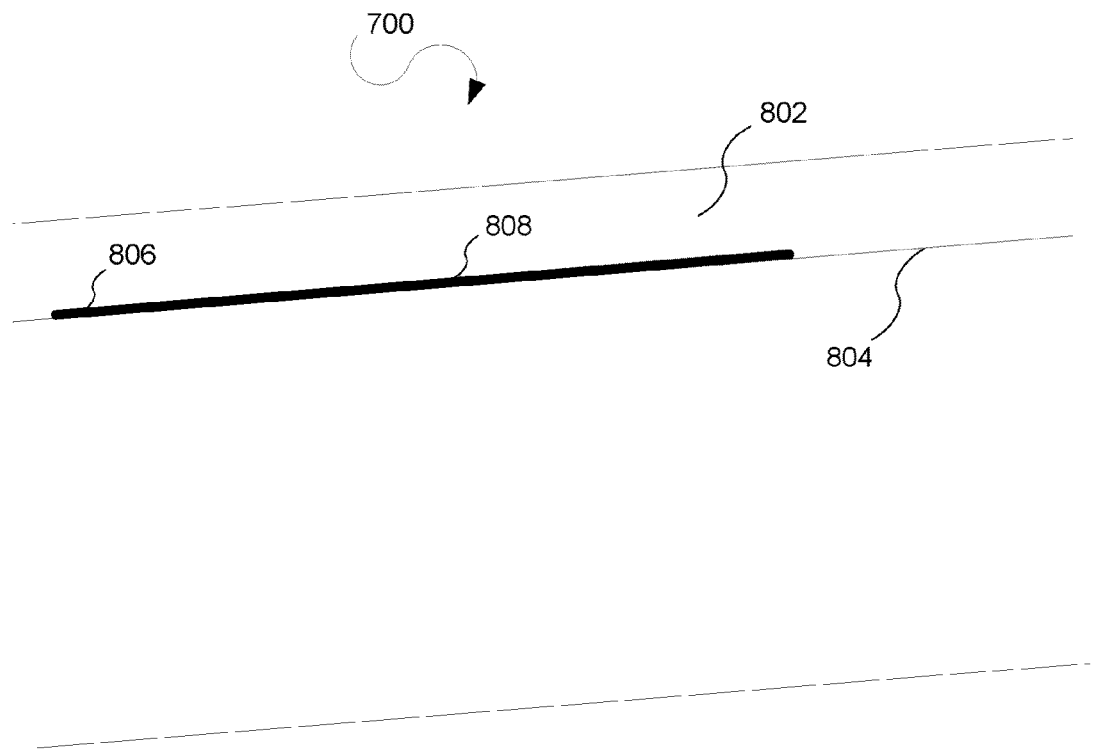
FIG. 8B illustrates an enlarged view of the drawing support tool illustrated in FIG. 7 with snapping.

FIG. 8B illustrates an enlarged view of the drawing support tool 700 illustrated in FIG. 7 with snapping. The second portion 808 is snapped to the predetermined distance so that a straight line against the edge within the predetermined distance is drawn. The first portion 806 and/or the second portion 808 may be straight lines, freeform drawings, or the like.

Figure 8C:
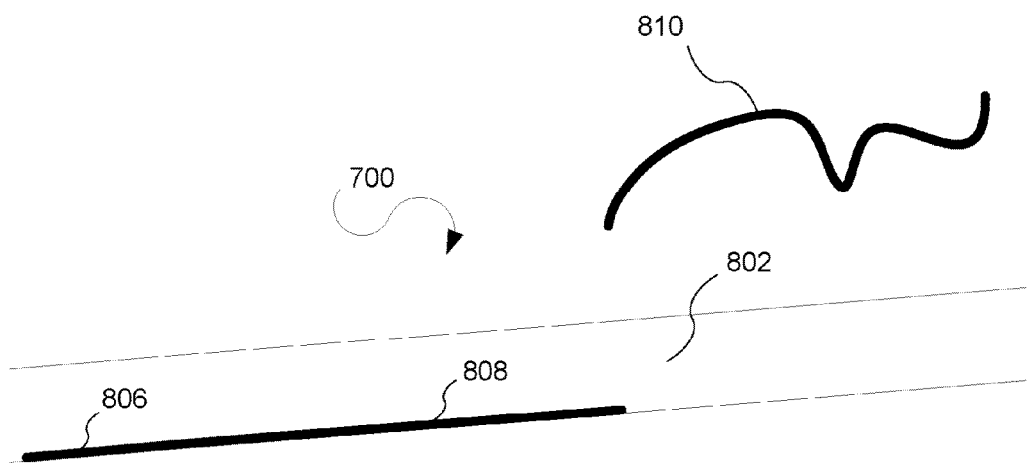
FIG. 8C illustrates an enlarged view of the drawing support tool illustrated in FIG. 7 with snapping and drawing data 810 drawn outside of the buffer region.

FIG. 8C illustrates an enlarged view of the drawing support tool 700 illustrated in FIG. 7 with snapping and drawing data 810 drawn outside of the buffer region. Such drawing data 810 is not snapped as that drawing data 810 is not within the buffer region.

In one embodiment, the drawing support tool may be utilized with an input device that is a touch enabled device. In one configuration, a touch input moves the shape. In another configuration, a first touch input and a second touch input moves the shape and rotates the shape.

Figure 9:
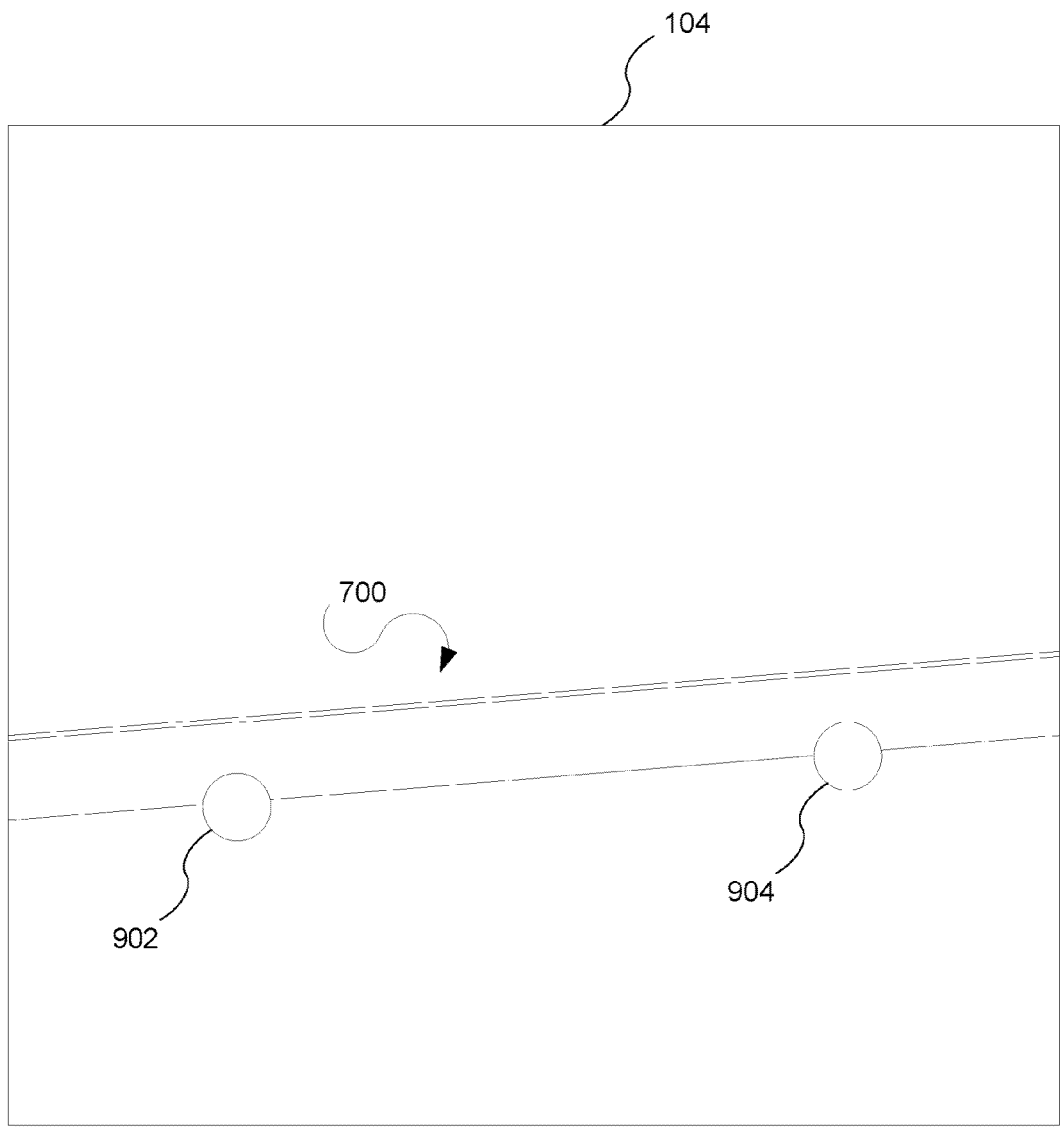
FIG. 9 illustrates an example of the drawing support tool that is not utilized with a touch enabled device.

In another embodiment, the drawing support tool 700 may be utilized with a device that is not touch enabled. FIG. 9 illustrates an example of the drawing support tool 700 that is not utilized with a touch enabled device. The drawing support tool 700 has a plurality of drag points such as a first drag point 902 and a second drag point 904 that may be utilized to drag, move, rotate, etc. the drawing support tool 700 with a pointer enabled device.

Figure 10:
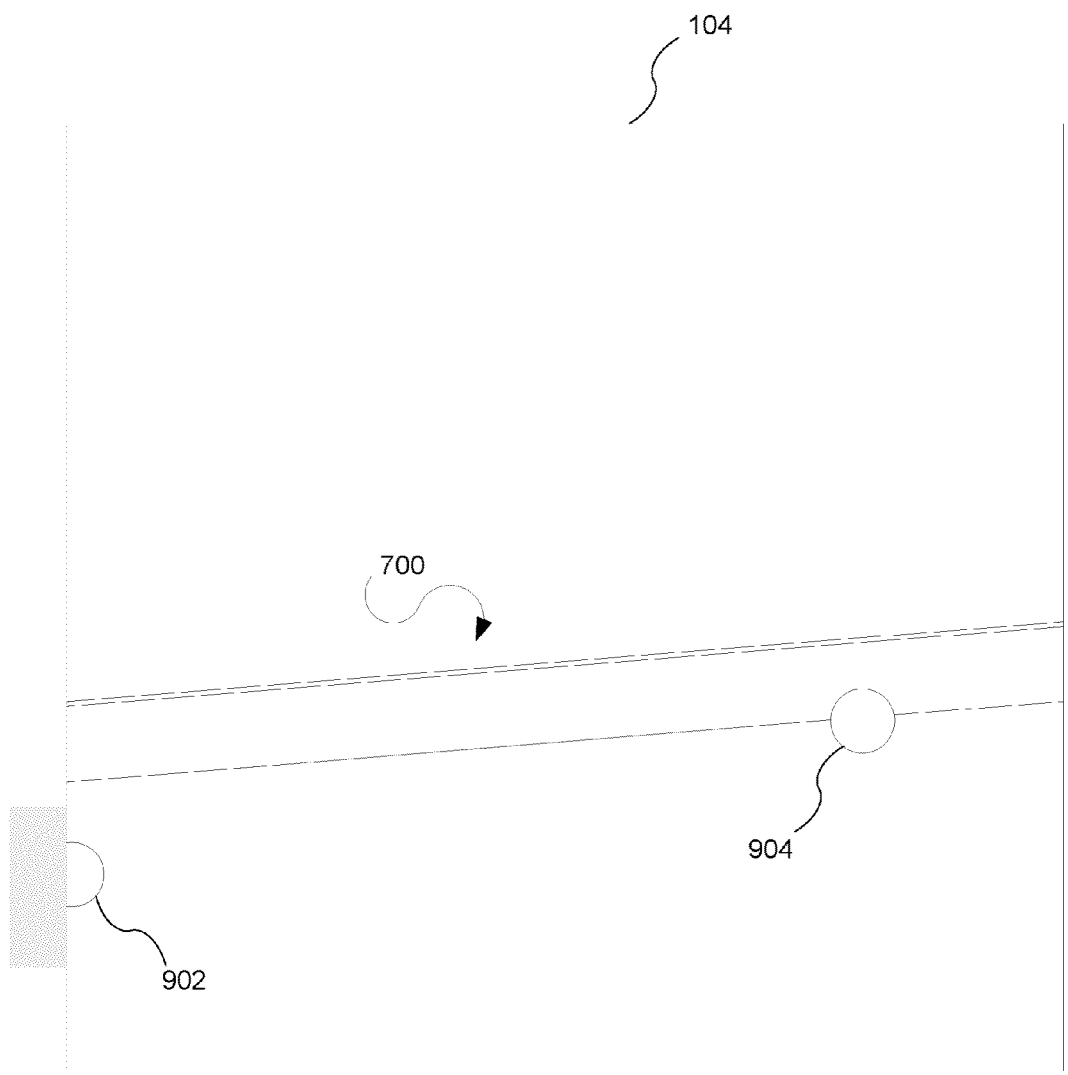
FIG. 10 illustrates an example of the drawing support tool illustrated in FIG. 9 where one of the drag points is utilized as an anchor point.

FIG. 10 illustrates an example of the drawing support tool 700 illustrated in FIG. 9 where one of the drag points is utilized as an anchor point. As an example, the first drag point 902 may be an anchor point that is moved to be partially outside the GUI 104 as a vanishing point for perspective drawing. In one embodiment, the half circle may be tapped to zoom out or miniaturize the drawing support tool 700. IN another embodiment, a pinch-zoom gesture may be utilized. By making the size of the drawing support tool 700 smaller, the vanishing point would be outside of the GUI 104. Accordingly, the vanishing point would be brought closer to the visible screen area of the GUI 104. Conversely, enlarging the drawing support tool 700 would take the vanishing point further outside to the left or right outside of the screen.

Figure 11:
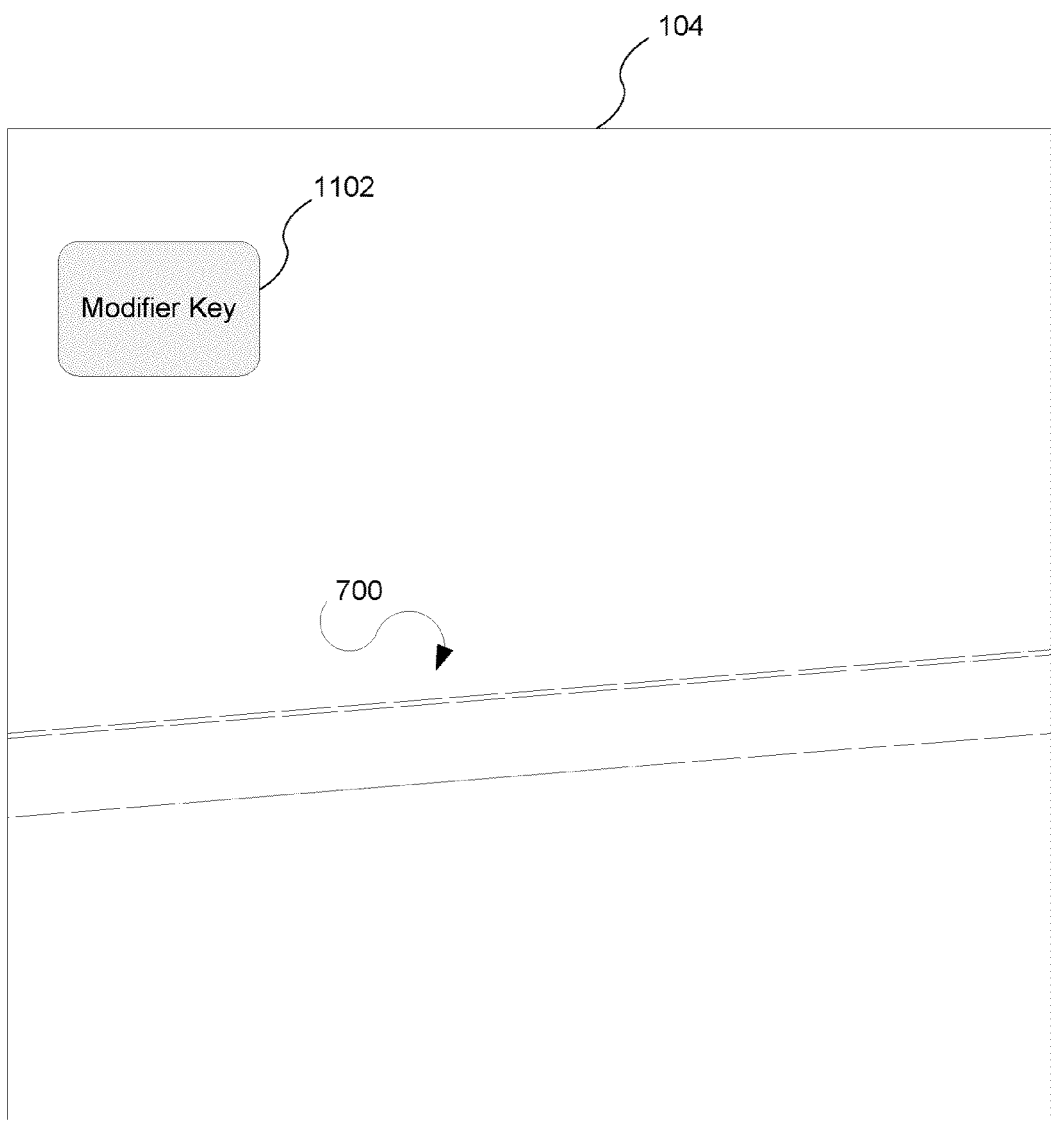
FIG. 11 illustrates a modifier key that may be utilized with the drawing support tool 700.

FIG. 11 illustrates a modifier key 1002 that may be utilized with the drawing support tool 700. The user may provide an input to the modifier key 1002 to indicate one or more different angles to which the drawing support tool 700 may be snapped. For example, the user can provide input to the modifier key 1002 to have the drawing support tool 700 rotate to a forty five degree angle. In one embodiment, each rounded square top is a button to snap to a particular angle. The angles may be based on the angles utilized for one, two, or three perspective drawing. In an alternative embodiment, one or more different vanishing points may be saved. Accordingly, the modifier key 1002 may be utilized to move to different saved vanishing points. Although a single modifier key 1002 is illustrated, a plurality of modifier keys may be utilized for any of the configurations described herein.

The snapping in any of the configurations described herein may be based moving designated portions of lines, shapes, etc. For example, the center of the width of a line may be utilized to measure the line from the predetermined distance and move the line. Any of the stencils or drawing support tools described herein may be applied to take into account geometric properties such the width of the line. Constant and/or variable widths may be utilized. An example of a variable width of a line results from utilization of a pressure sensitive pen in the physical world or the virtual world.

The buffer region described herein may be utilized with any type of shape. As an example, a circular drawing support tool with a buffer region around the circle may be utilized. As a result, a user may be able to utilize a virtual compass to draw a circle.

Figure 12:
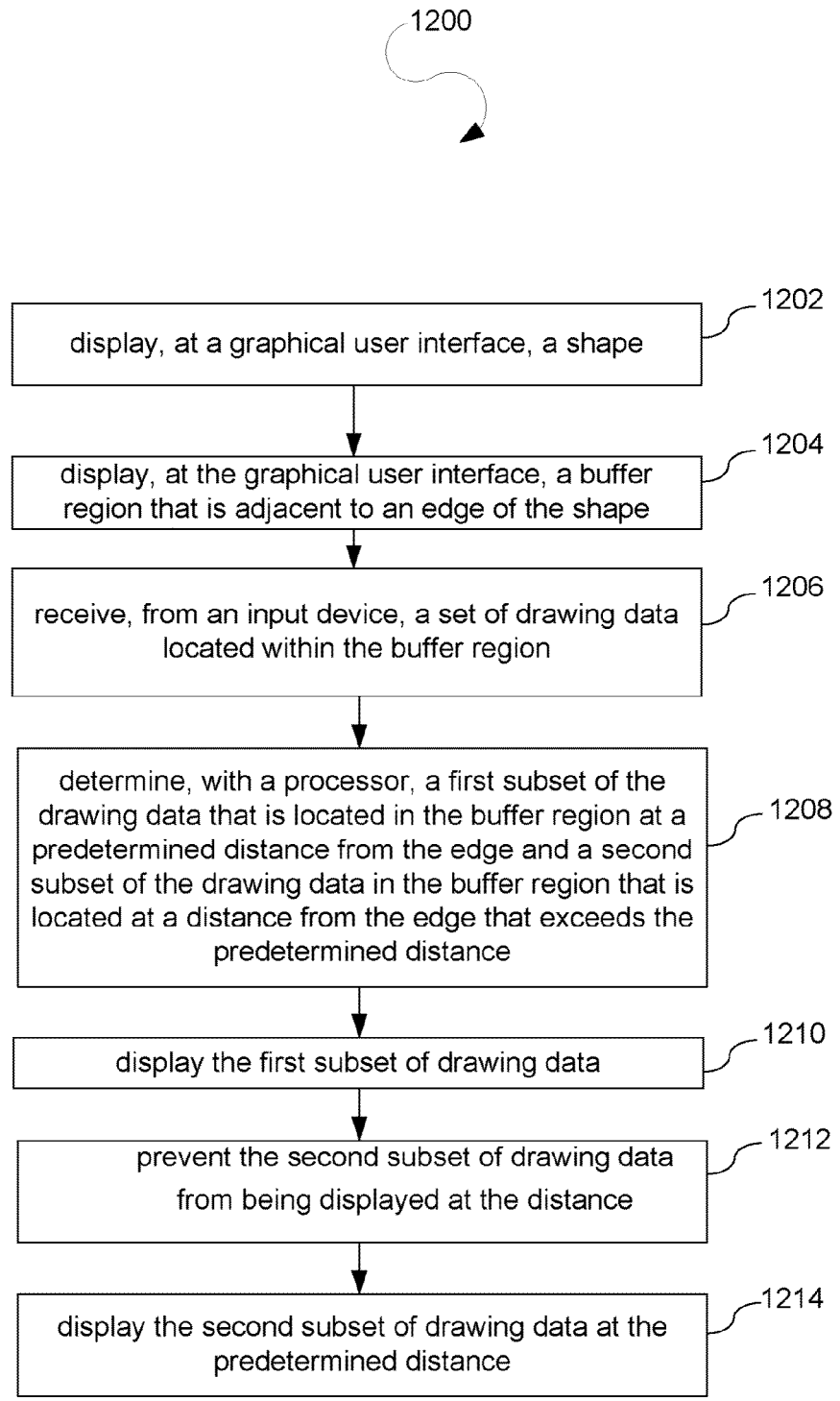
FIG. 12 illustrates a process that may be utilized to provide a drawing support tool.

FIG. 12 illustrates a process 1200 that may be utilized to provide a drawing support tool. At a process block 1202, the process 1200 displays, at a graphical user interface, a shape. Further, at a process block 1204, the process 1200 displays, at the graphical user interface, a buffer region that is adjacent to an edge of the shape. In addition, at a process block 1206, the process 1200 receives, from an input device, a set of drawing data located within the buffer region. At a process block 1208, the process 1200 determines, with a processor a first subset of the drawing data that is located in the buffer region at a predetermined distance from the edge and a second subset of the drawing data in the buffer region that is located at a distance from the edge that exceeds the predetermined distance. Further, at a process block 1210, the process 1200 displays the first subset of drawing data. At a process block 1212, the process 1200 prevents the second subset of drawing data from being displayed at the distance. Further, at a process block 1214, the process 1200 displays the second subset of drawing data at the predetermined distance.

In another embodiment, a drawing support tool is a drawing accessory. The drawing accessory is a graphical object that affects the behavior of the drawing tools within a system. As graphical objects, the drawing accessories are software components such that their visual depiction is their primary user interface. Further, the primary means of control is the physical manipulation of those graphical objects by dragging control handles. The control handles may include portions of a graphical object located inside or outside of the graphical object. Further, a control handle may occupy the entire area of the graphical object. For instance, in one configuration, the entire area of a straight edge drawing support tool is a multi-touch control handle. In one embodiment, drawing accessories, e.g., the straight edge drawing support tool, may be depicted with instructive ideograms providing the user with a queue as to the available functionality. For example, one finger may drag parallel and two fingers may drag in order to adjust the angle of the straight edge.

Other implementations may provide additional control handles, buttons, or other user interface elements. In another configuration, a toggle button may be utilized as a switch to determine whether the parallel motion of the straight edge should be constrained to regular increments. In other words, the toggle button may be utilized to form a grid. The user may drag the straight edge by the grid toggle in order to reset the grid origin. In one embodiment, drag handles perform different functions when clicked as opposed to when being dragged. In another embodiment, the drag handles perform different functions depending on the number of points that the drag handles are dragged by.

Figure 13:
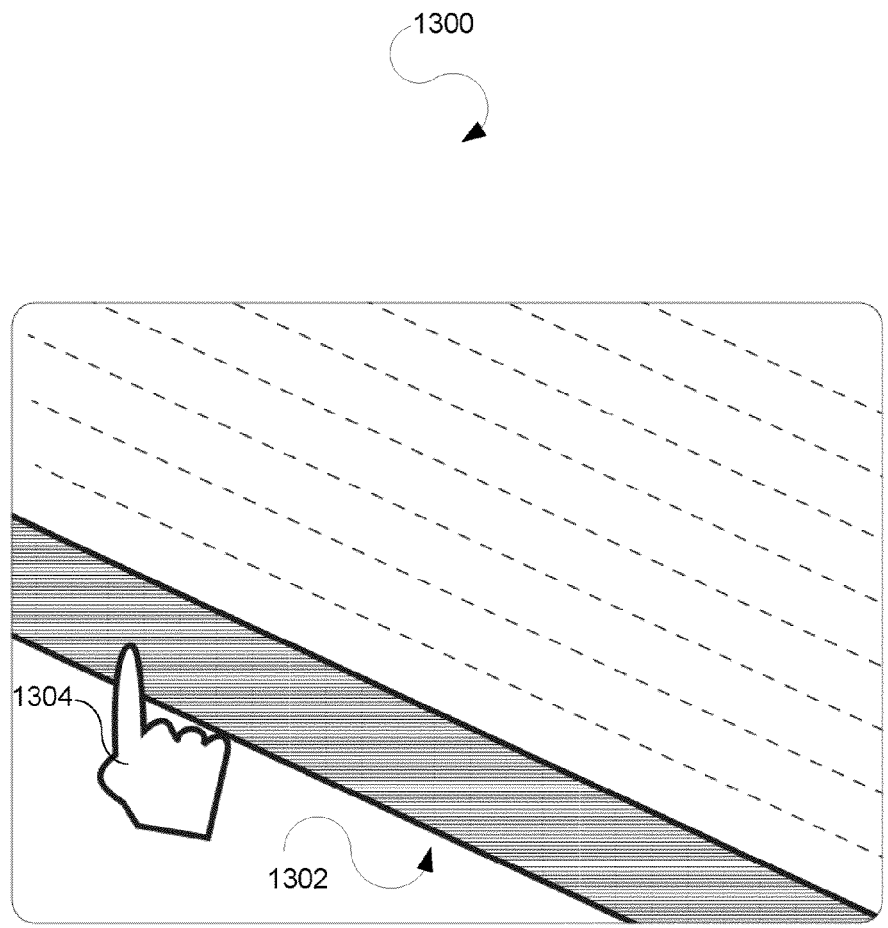
FIG. 13 illustrates a GUI having a parallel straight edge being dragged and snapping locations.

Further, in yet another embodiment, when the user is dragging a drawing support tool, assistive graphics may be displayed on the GUI depending on the options that are selected. FIG. 13 illustrates a GUI 1300 having a parallel straight edge 1302 being dragged and snapping locations. When snapping is active, the snap locations are shown on the GUI when a hand 1304 of the user is touching the straight edge to drag it. In the illustrated example, the snap locations are shown as broken lines.

Figure 14:
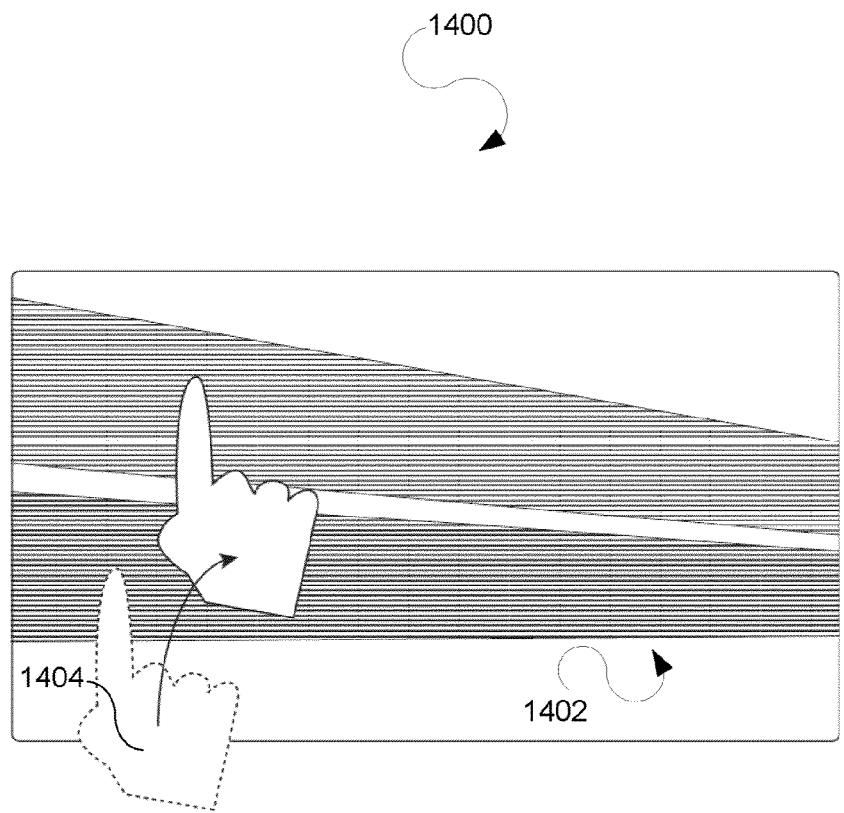
FIG. 14 illustrates a GUI having a parallel straight edge in perspective/vanishing-point-mode being dragged by a hand of the user.

In addition to instructive graphics or text, a drawing accessory may have buttons to alter its mode of operation or drag areas. As an example, a ruler may have an icon on its surface. The user may tap the ruler to active and deactivate vanishing points. The user may press and drag, e.g., as in a menu, to select which vanishing point to utilize, e.g., utilizing the left horizon or the right horizon. When a vanishing point is in use, the visual depiction of the straight edge may be changed to provide visual reinforcement of the active mode and to allow the user to draw with both edges of the straight edge. When vanishing points are active, the top and the bottom edge of the straight edge are not parallel. FIG. 14 illustrates a GUI 1400 having a parallel straight edge 1402 in perspective/vanishing-point-mode being dragged by a hand 1404 of the user.

Figure 15A:
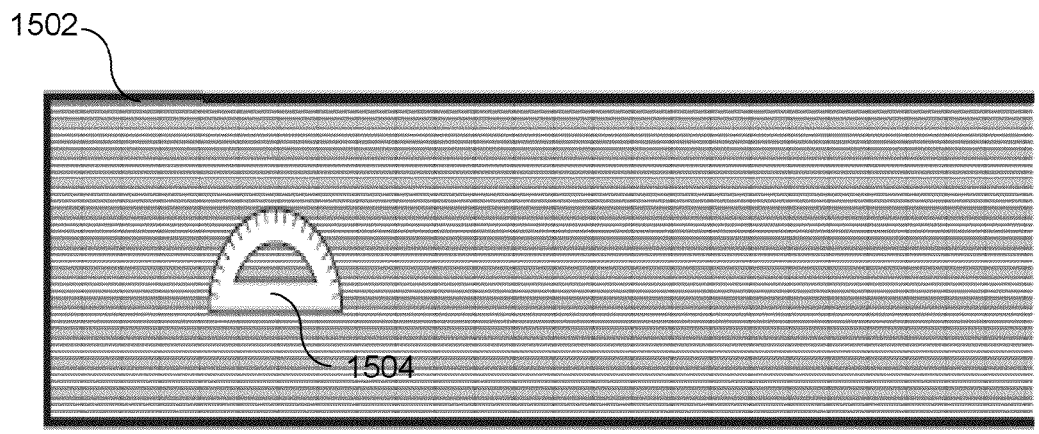
FIG. 15A illustrates a ruler with a protractor button.
Figure 15B:
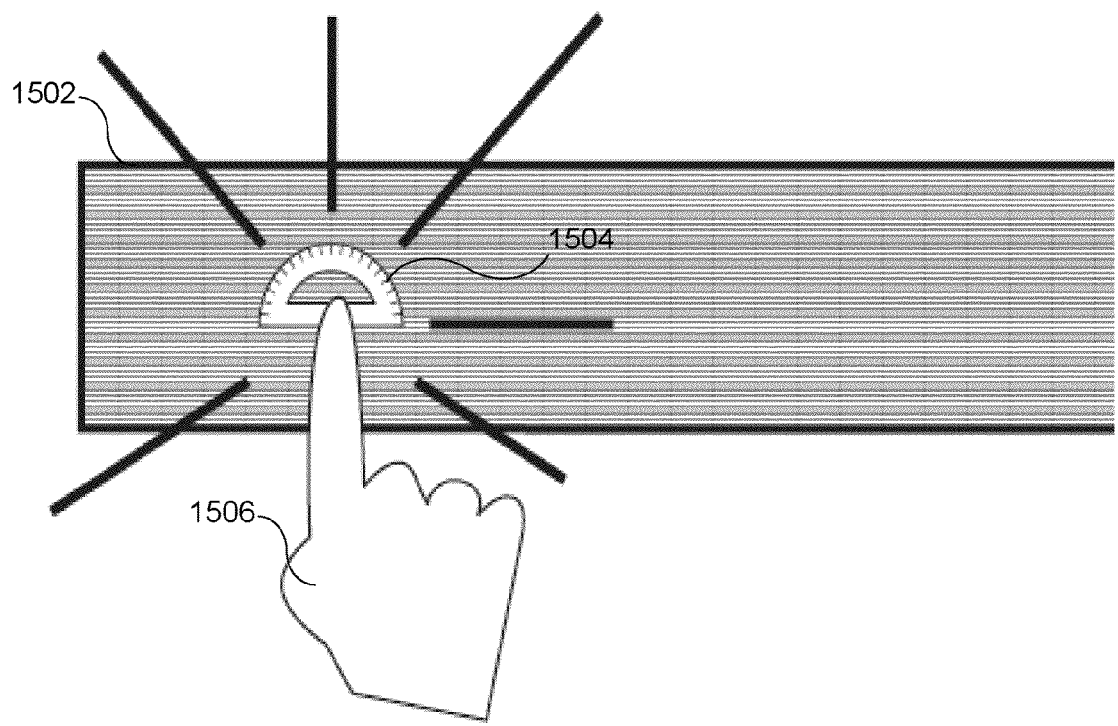
FIG. 15B illustrates a hand of the user tapping on the protractor button.
Figure 15C:
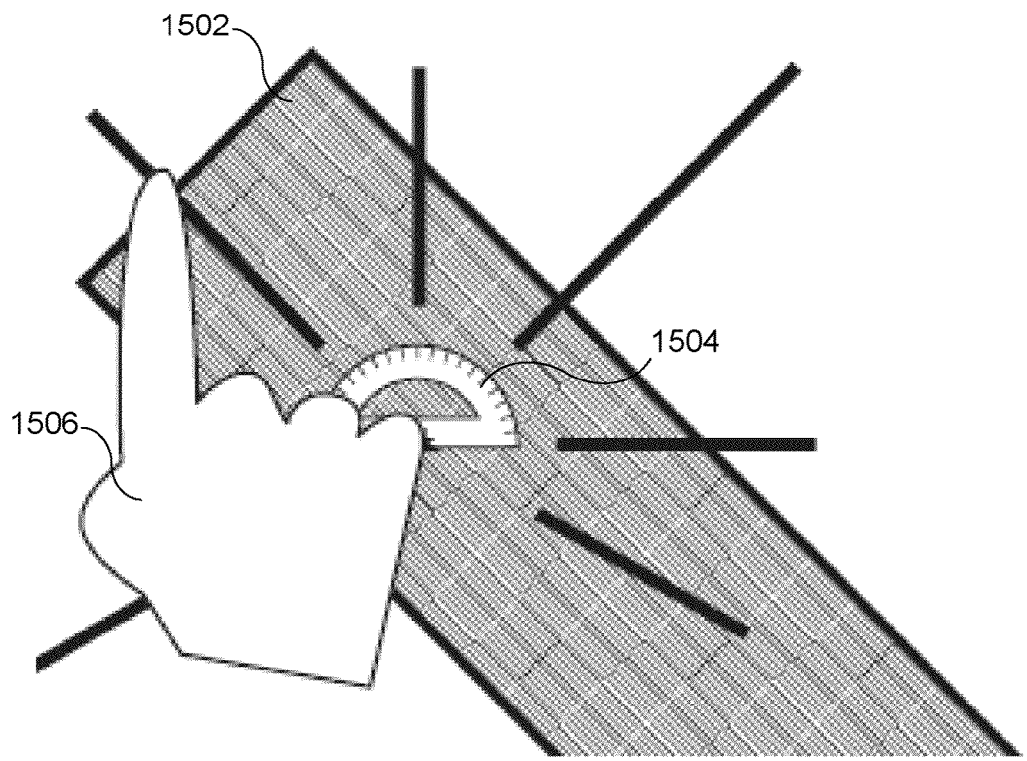
FIG. 15C illustrates the hand of the user selecting a pre-defined angle to which the ruler is repositioned.

FIG. 15A illustrates a ruler 1502 with a protractor button 1504. The protractor button 1504 may be utilized to quickly return the ruler 1502 to a fixed angle or to quickly reach a predefined angle. FIG. 15B illustrates a hand 1506 of the user tapping on the protractor button 1504. If the user simply taps on the protractor, the ruler would move to the horizontal position. If the ruler is already in the horizontal position, the user would move to the vertical position. A third tap would return the user to the pervious free angle. FIG. 15C illustrates the hand 1506 of the user selecting a predefined angle to which the ruler is repositioned. In one embodiment, if the user presses and holds, a pie menu is shown allowing the user to quickly read a predefined angle.

Figure 16:
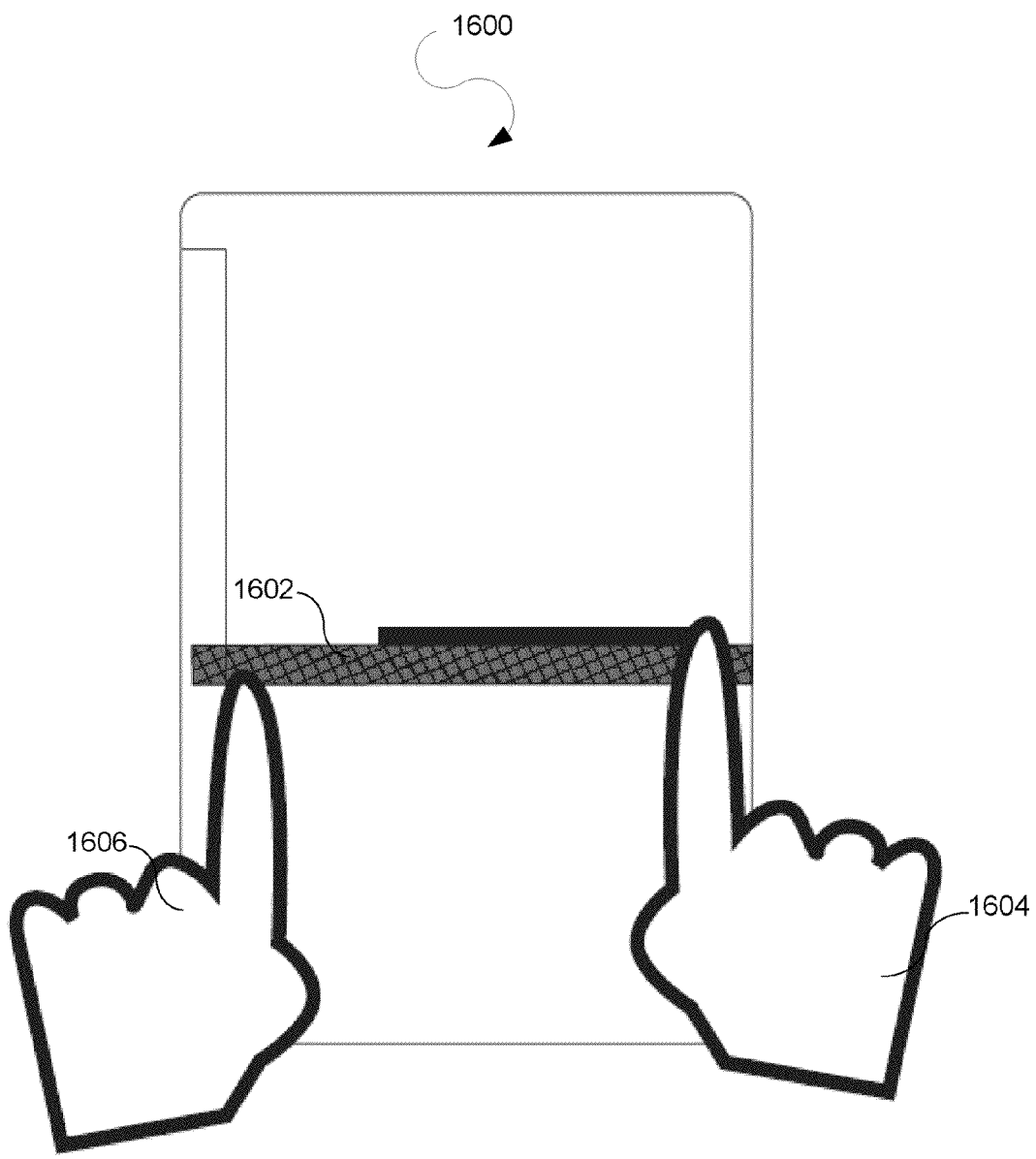
FIG. 16 illustrates a small GUI with a straight edge drawing support tool 1602.

A variety of alternate interfaces may be utilized with the drawing support tool configurations described herein. For small GUIs, e.g., on a mobile device, a straight edge drawing support tool may be manipulated without having to have the secondary hand covering the GUI, which has the additional benefit of allowing the straight edge to be visually quite small. FIG. 16 illustrates a small GUI 1600 with a straight edge drawing support tool 1602. The primary hand 1604 of the user and/or the secondary hand 1606 of the user may be utilized to manipulate the straight edge drawing support tool on the small GUI 1600.

Figure 17:
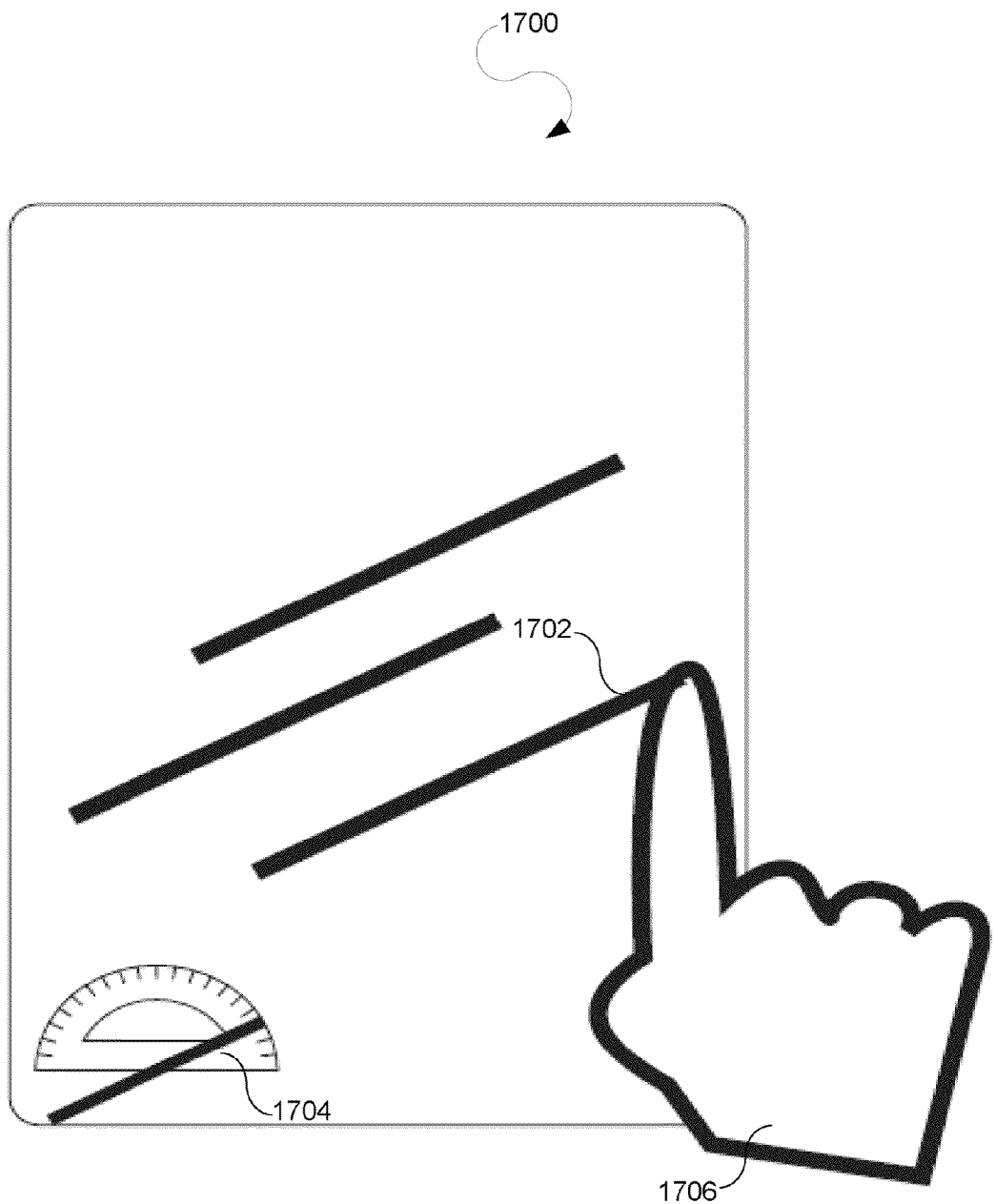
FIG. 17 illustrates a GUI with an implied straight edge drawing support tool 1702 and an implied protractor drawing support tool.

FIG. 17 illustrates a GUI 1700 with an implied straight edge drawing support tool 1702 and an implied protractor drawing support tool 1704. The user may interact with the implied straight edge drawing support tool 1702 and the implied protractor drawing support tool 1704 with the hand 1706. For the implied straight edge drawing support tool 1704, an intermediate approach between free drawing and the constraint of a straight edge may be utilized. When the implied straight edge drawing support tool 1704 is active, all drawing is constrained to an exact orientation.

Figure 18:
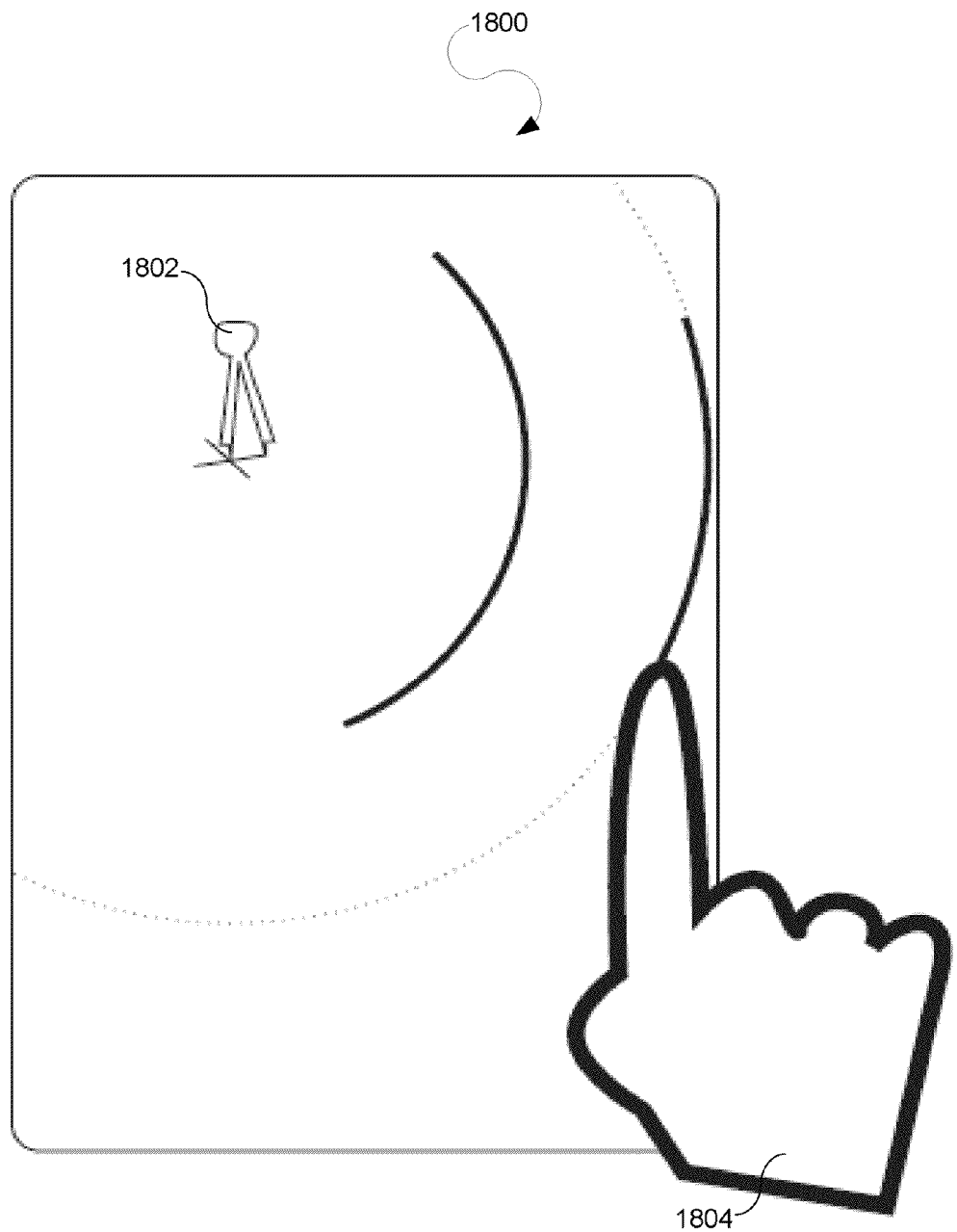
FIG. 18 illustrates a GUI with an implied compass drawing support tool 1802.

FIG. 18 illustrates a GUI 1800 with an implied compass drawing support tool 1802. A hand 1804 of the user may interact with the implied compass drawing support tool 1802. Further, the implied compass drawing support tool 1802 restricts drawing to arcs with a shared center point.

Physical modeling of friction and inertia may be utilized to enhance the feeling that the drawing accessories are physical objects. Drawing accessories may be utilized in conjunction with one another. For example, a virtual triangle may be utilized with a virtual parallel in order to easily and consistently produce lines at precise and reproducible angles. For instance, the combination of a 30-60-90 triangle and a 45 degree triangle may be combined to produce any angle in an increment of fifteen degrees. The implementation may include modeling collision detection between drawing accessories. Other implementations may be abstract constraints where a triangle moved by the user will snap into position if released approximately touching and aligned with the straight edge of another drawing accessory.

Figure 19A:
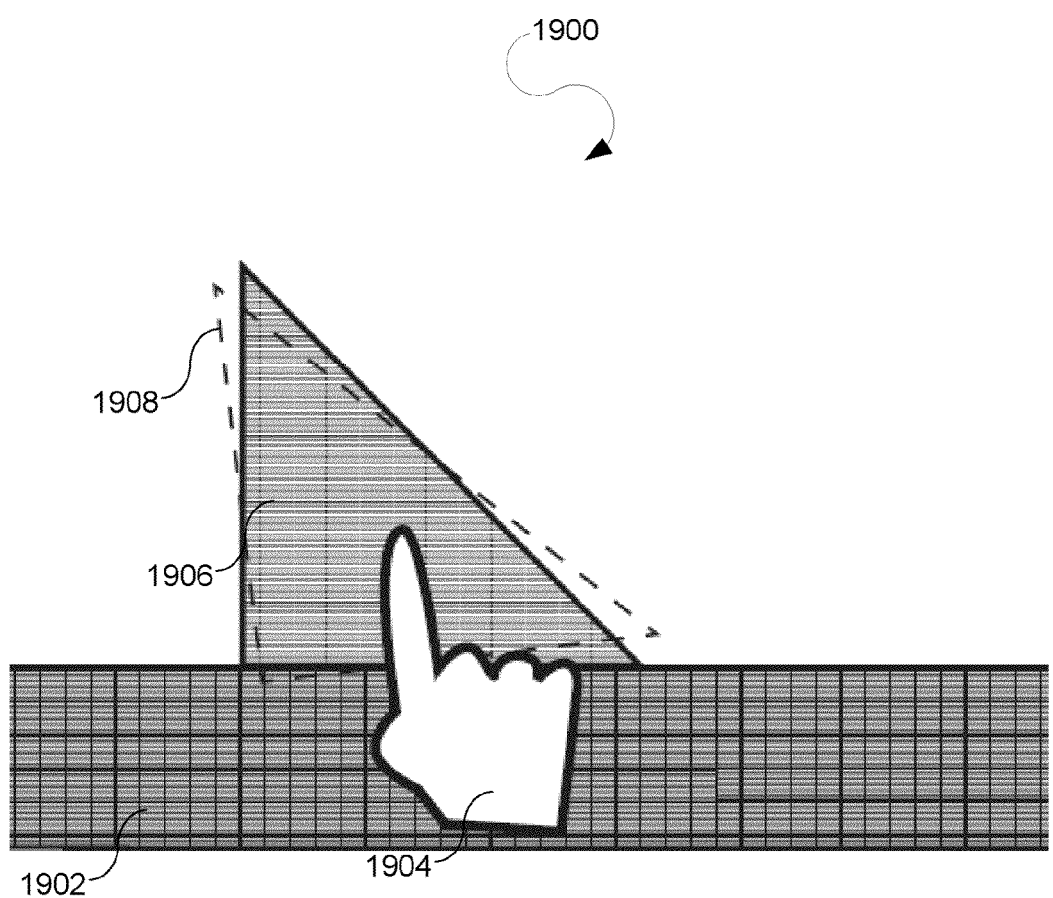
FIG. 19A illustrates a display where snapping feedback may be utilized.
Figure 19B:
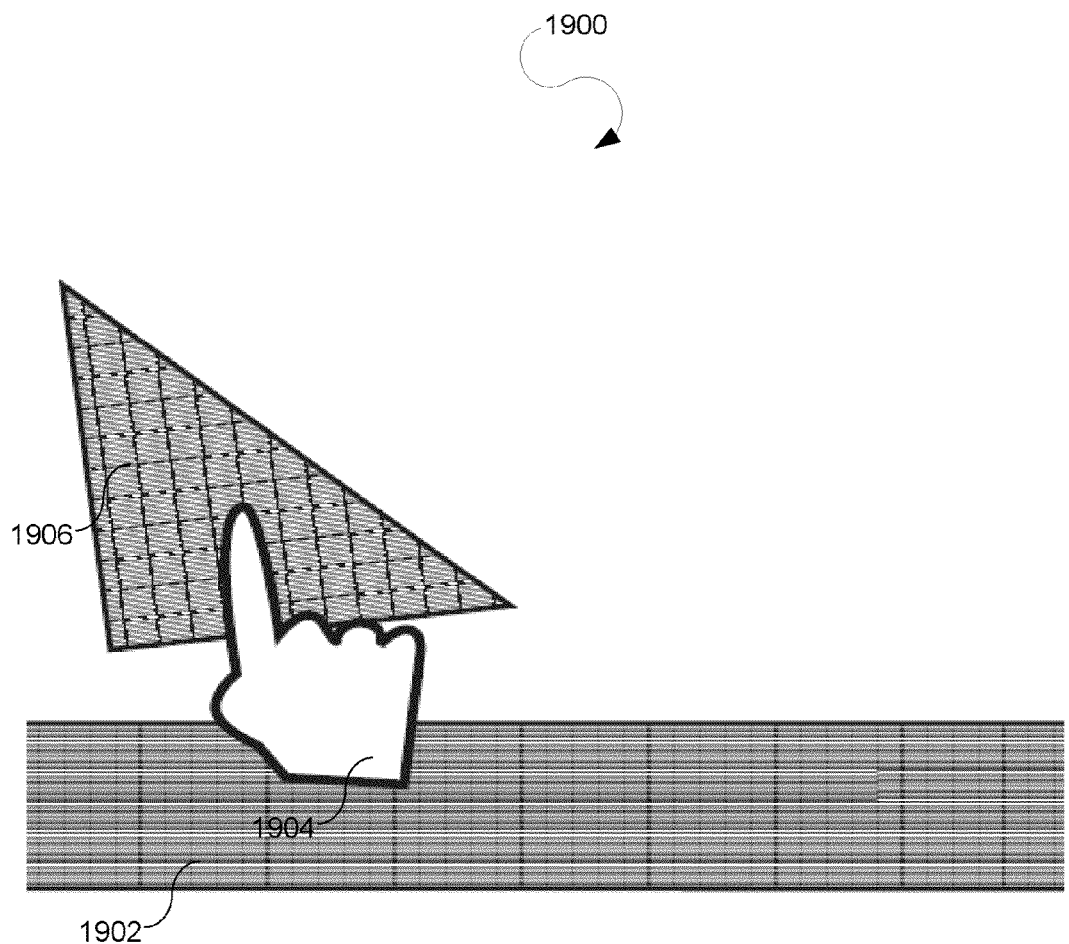
FIG. 19B illustrates the virtual triangle in the snapped location.

FIG. 19A illustrates a display 1900 where snapping feedback may be utilized. During the dragging of a drawing accessory by a hand 1904 of the user along a drawing straight edge drawing support tool 1902, visual feedback is provided to show both the raw current location 1906 evaluated without any snap constraints and the snapped location 1908 determined by applying all snap constraints. FIG. 19B illustrates the virtual triangle in the snapped location 1908. These depictions are visually distinct, e.g., one may be a ghost depiction of the other. The term ghost depiction is intended to mean a depiction with a greatly reduced alpha value as just an outline or a combination of the two depictions.

Figure 20A:
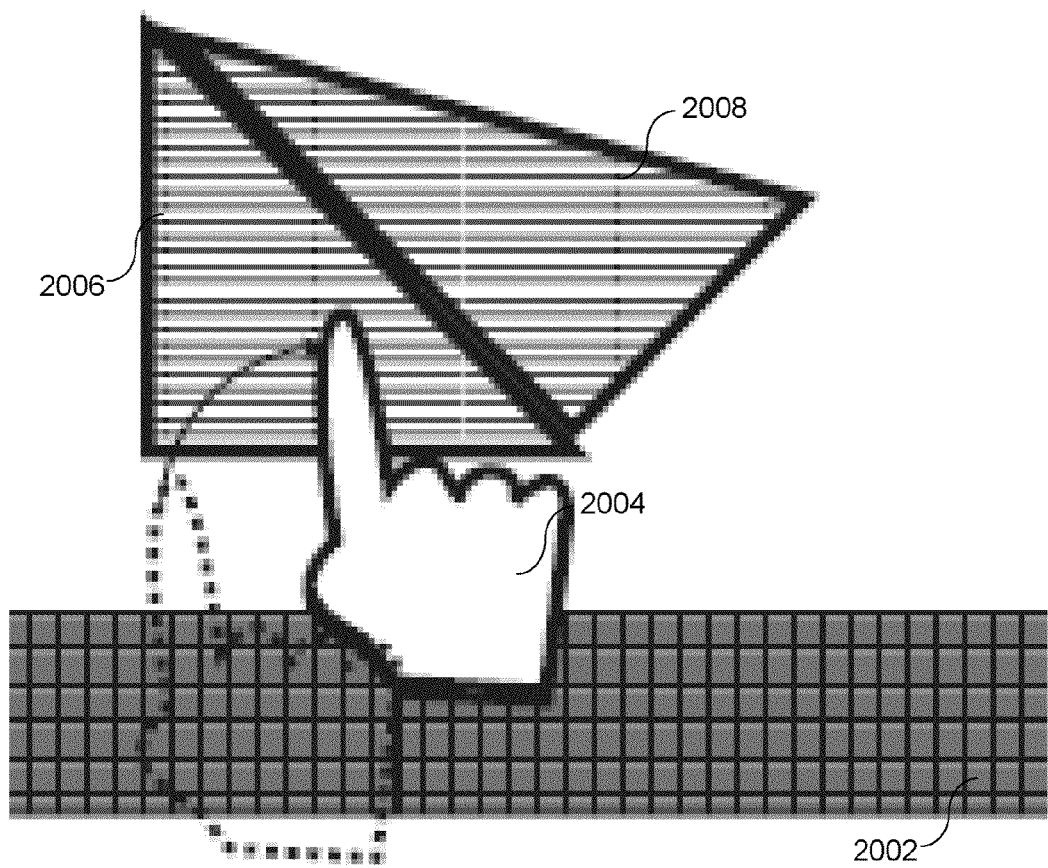
FIG. 20A illustrates a hand of a user moving a virtual triangle, which is the root of the hierarchy.
Figure 20B:
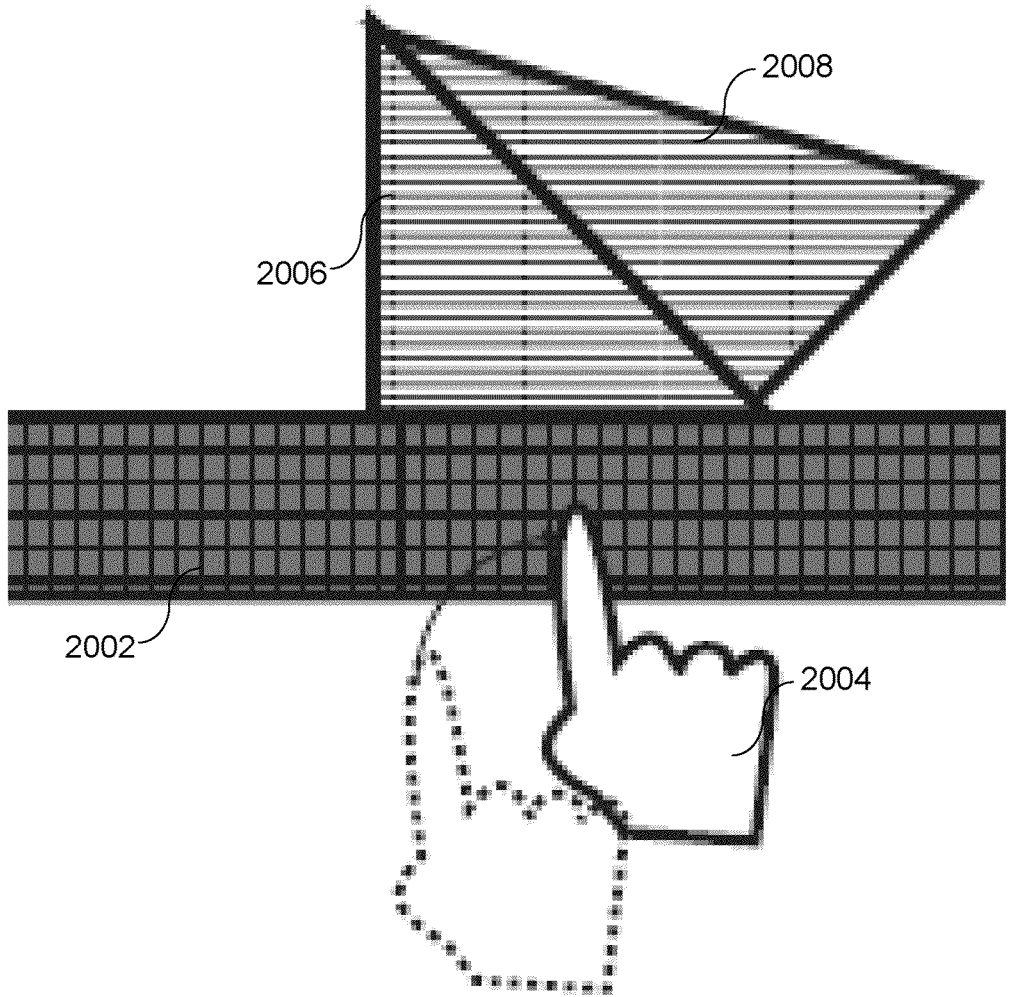
FIG. 20B illustrates the parallel drawing support tool as the root of the hierarchy.
Figure 20C:
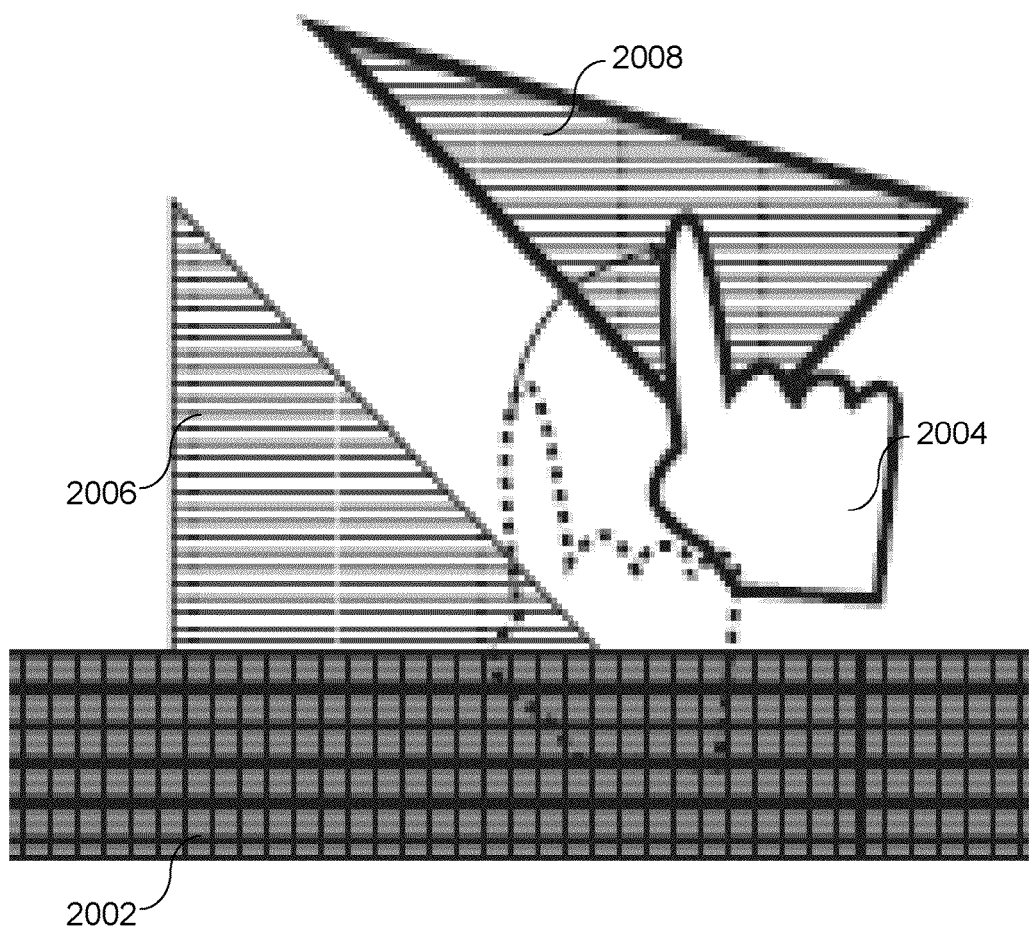
FIG. 20C illustrates a hand of a user moving a child item without moving parent items.

As drawing accessories are connected to one another, they form a hierarchy of connections. The root of this hierarchy may be visually distinguished, e.g., by changing its color or darkening its outline. FIG. 20A illustrates a hand 2004 of a user moving a virtual triangle 2006, which is the root of the hierarchy. Accordingly, the virtual triangle is moved away from the parallel drawing support tool 2002. However, an additional virtual triangle 2008, which is connected to the virtual triangle 2006, is moved with the virtual triangle 2006. Alternatively, a specific tool may be marked as always being the root of the hierarchy. FIG. 20B illustrates the parallel drawing support tool 2002 as the root of the hierarchy. When an item is moved, all of its child objects and their descendants are also moved to maintain their relative positions. For example, when the hand 2004 of the user moves the parallel drawing support tool 2002, the parallel drawing support tool 2002, the virtual triangle 2006, and the additional virtual triangle 2008 are all moved. In another embodiment, when a child item is moved, the parent item(s) are not moved. The child item moves in accordance with constraints imposed by its parent items until the child item has been moved outside of the snapping range. FIG. 20C illustrates the additional virtual triangle 2008 being moved without the virtual triangle 2006 as the root being moved or the parallel drawing support tool 2002 being moved.

Figure 21:
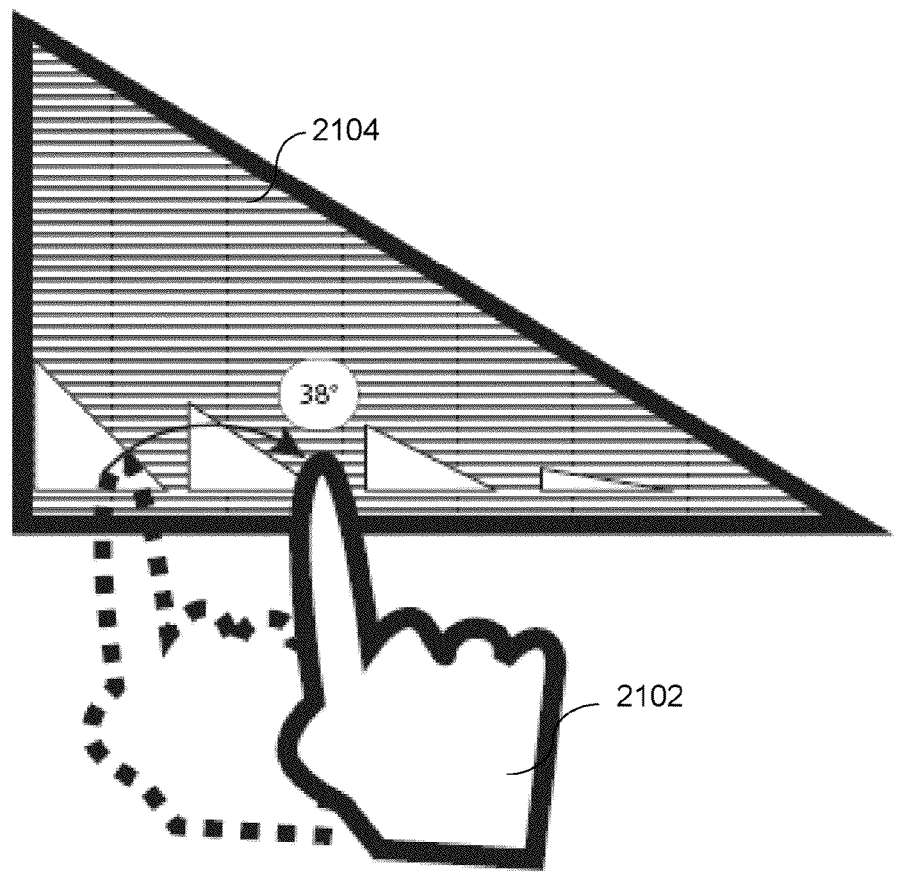
FIG. 21 illustrates a virtual triangle from which a user may create one or more virtual triangles with preset angles.

FIG. 21 illustrates a virtual triangle 2104 from which a user may create one or more virtual triangles with preset angles. As an example, the virtual triangle 2104 may be a drawing accessory with a user interface upon its surface that allows a hand 2102 of the user to select from the different preset angles. The selection may be made via one or more individual buttons, one or more popup menus, one or more drag handles, a sub-combination of these options, or a combination of these options.

Figure 22:
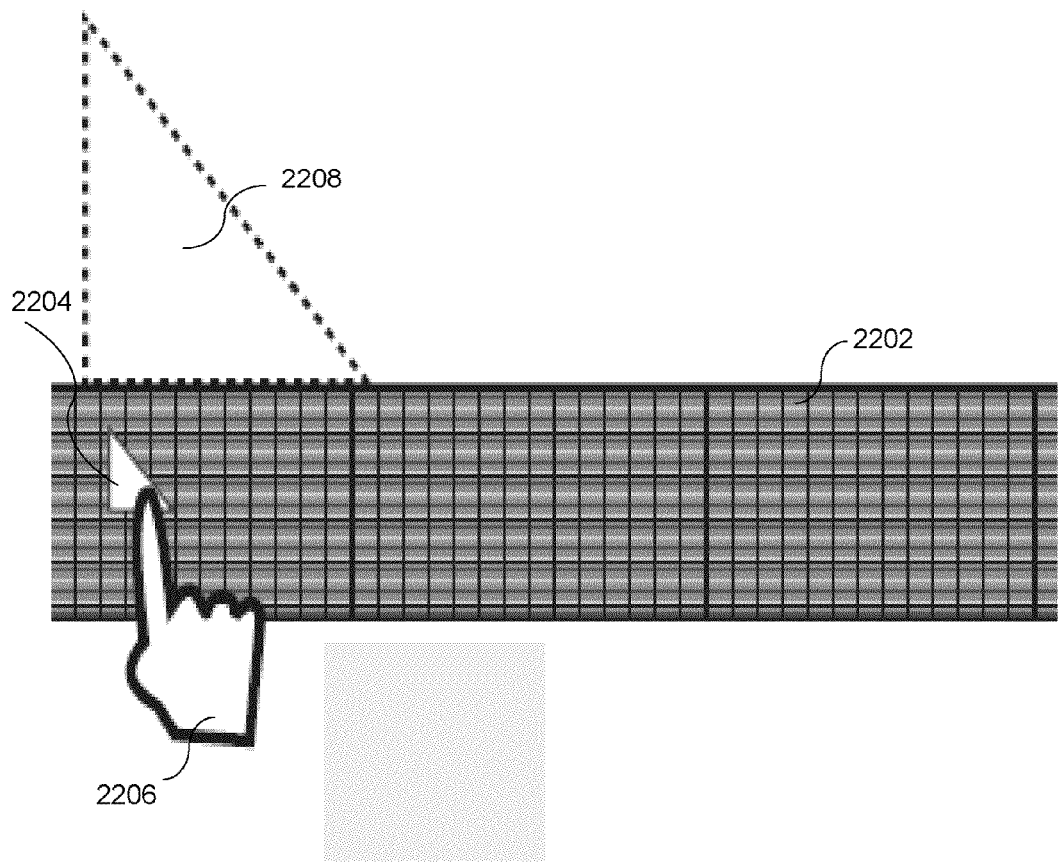
FIG. 22 illustrates a parallel drawing support tool with a shortcut user interface 2204 that may be utilized to create and/or dismiss secondary drawing accessories.

FIG. 22 illustrates a parallel drawing support tool 2202 with a shortcut user interface 2204 that may be utilized to create and/or dismiss secondary drawing accessories. An example of a secondary drawing accessory is a virtual triangle. Accordingly, a hand 2206 of the user may press the shortcut user interface of a forty five degree triangle within the parallel drawing support tool 2202 to create a forty five degree virtual triangle 2208. The system may then place the virtual triangle along the parallel drawing support tool 2204. Before releasing the button, the user may continue to drag the shortcut user interface 2204, which corresponds with motion of the virtual triangle, until the virtual triangle is in the intended destination on or away from the parallel drawing support tool 2202. The shortcut user interface 2204 may include one or more individual buttons, one or more popup menus, one or more drag handles, a sub-combination of these options, or a combination of these options.

Figure 23:
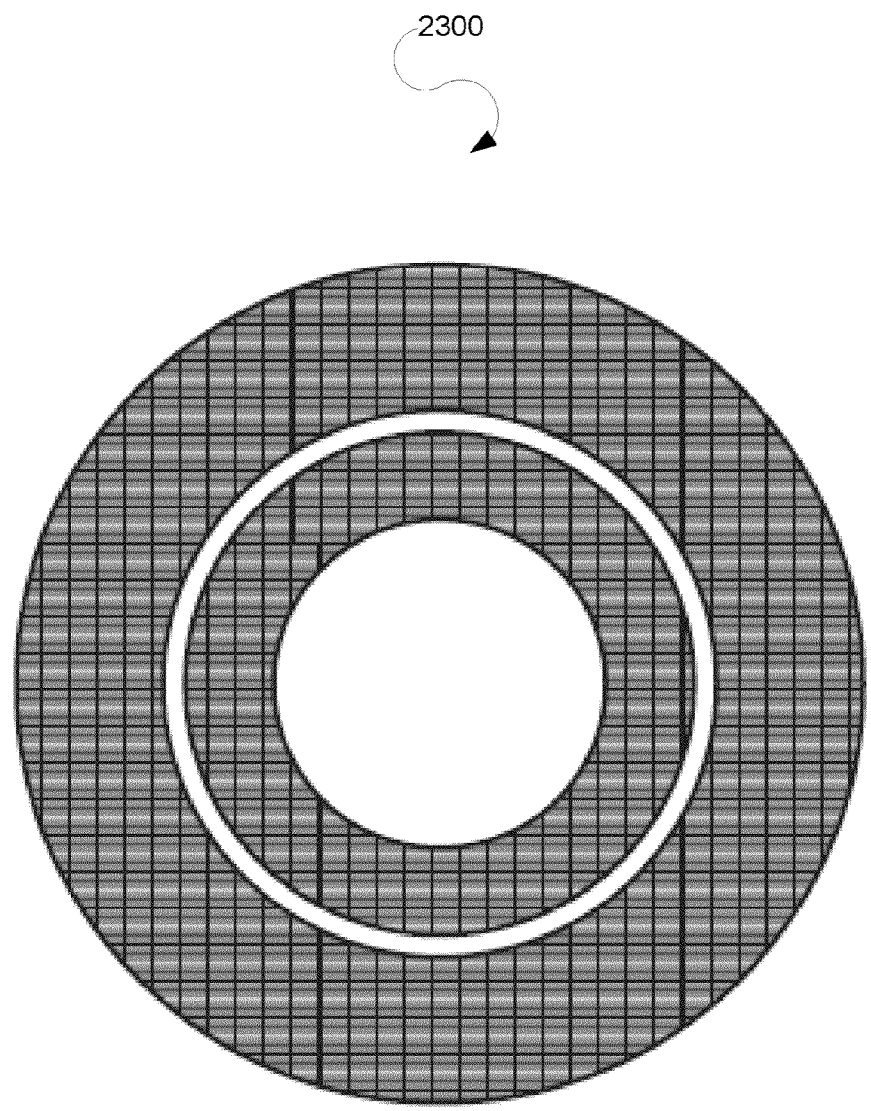
FIG. 23 illustrates a circle template that may respond to two-fingered dragging.

FIG. 23 illustrates a circle template 2300 that may respond to two-fingered dragging. The two-fingered dragging may be utilized to scale to an arbitrary size. Alternatively, the two-fingered dragging may be constrained to snap to specific values. The circle template may have specific drag areas, e.g., drag handles, that allow the user to change the radius of the circle without changing its center point. Further, one or more buttons, one or more popup menus, or some other user interface maybe utilized to allow the user to select specific sizes. The circle template may be configured to have multiple radii simultaneously. Instead of having a single hold in the middle, the circle template 2300 may have additional rings of materials inside.

The circle template 2300 may have a user interface, e.g., button, to distort the circle to a given projection plane, isometric plane, or orthographic plane. Further, the circle template 2300 ma also pick up this data from the parallel drawing support tool or synchronize this data automatically. In addition, the circle template 2300 may participate in the snapping behavior described for virtual triangles where the edge of the circle or center of the circle may snap to a straight edge drawing support tool or another circle. Further, the circle template 2300 may be extended to an ellipse template by providing one or more individual drag handles, buttons, and/or direct or indirect touch-gestures to adjust the major and minor radii and the orientation of the ellipse either individually or in a synchronized manner. The ellipse template may additional snap its major axis and/or its minor axis to a straight edge drawing support tool.

Although many of the configurations have been described with respect to touch-enabled devices, other devices may be utilized. For example, a user may utilize one or more drag handles with a computer mouse to interact with the drawing support tools described herein.

The system configuration 600 illustrated in FIG. 6 may be utilized to implement the drawing support tool 700 illustrated in FIG. 7. Further, the processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the processes and systems described herein can take the form of entirely hardware embodiments, entirely software embodiments, or embodiments containing both hardware and software elements. If software is utilized to implement the method or system, the software can include but is not limited to firmware, resident software, microcode, etc.

It is understood that the processes and systems described herein may also be applied in other types of processes and systems. Those skilled in the art will appreciate that the various adaptations and modifications of the embodiments of the processes and systems described herein may be configured without departing from the scope and spirit of the present processes, systems, and computer program products. Therefore, it is to be understood that, within the scope of the appended claims, the present processes, systems, and computer program products may be practiced other than as specifically described herein.

We claim:

1. A non-transitory computer useable storage memory having executable program instructions stored thereon that, responsive to execution by a computing device, cause the computing device to:
   display a shape and a buffer region adjacent to an edge of the shape on a graphical user interface;

receive, from an input device, a set of freeform drawing data located within the displayed buffer region;

detecting an edge touching subset of the freeform drawing data, the edge touching subset including freeform drawing data that is touching an edge of the shape and, responsive to said detecting, providing a visual indication that the edge touching subset of the freeform drawing data is touching the shape;

determine a first subset of the freeform drawing data located within a predetermined distance from the edge of the shape;

determine a second subset of the freeform drawing data located at a distance from the edge of the shape that exceeds the predetermined distance;

display the first subset of the freeform drawing data;

prevent the second subset of the freeform drawing data from being displayed at the distance from the edge of the shape that exceeds the predetermined distance;

display the second subset of the freeform drawing data repositioned within the predetermined distance; and move the shape according to a hierarchy of connected shapes, the shape being a root shape connected to a child shape and the root shape dictates a movement behavior of the child shape.

2. The non-transitory computer useable storage memory of claim 1, wherein the input device is a touch enabled device.

3. The non-transitory computer useable storage memory of claim 2, wherein the program instructions are further executable by the computing device to move the shape responsive to detection of a touch input.

4. The non-transitory computer useable storage memory of claim 3, wherein the program instructions are further executable by the computing device to rotate the shape responsive to detection of a second touch input.

5. The non-transitory computer useable storage memory of claim 1, wherein the shape has one or more drag points enabling manipulation of the shape responsive to detection of an input at one or more of the drag points.

6. The non-transitory computer useable storage memory of claim 1, wherein the program instructions are further executable by the computing device to:
display a modifier key on the graphical user interface; and
responsive to detection of an input to the modifier key, snap the shape to an angle.

7. The non-transitory computer useable storage memory of claim 1, wherein the program instructions are further executable by the computing device to display one or more moveable vanishing points of the shape for perspective drawing.

8. The computer useable storage memory of claim 1, wherein the program instructions are further executable by the computing device to display a drawing support tool on the graphical user interface.

9. A method comprising:
displaying a shape and a buffer region that is adjacent to an edge of the shape on a graphical user interface;
detecting an input to the shape;
responsive to detecting the input to the shape, displaying one or more snapping locations within the buffer region;
receiving a set of drawing data located within the buffer region;
determining a first subset of the drawing data located within a predetermined distance from the edge of the shape;
determining a second subset of the drawing data located at a distance from the edge of the shape that exceeds the predetermined distance;
displaying the first subset of the drawing data;

preventing the second subset of the drawing data from being displayed at the distance from the edge of the shape that exceeds the predetermined distance;
displaying the second subset of the drawing data at one of the one or more displayed snapping locations within the predetermined distance; and
moving the shape according to a hierarchy of connected shapes, the shape being a root shape connected to a child shape and the root shape dictating a movement behavior of the child shape.

10. The method of claim 9, wherein the set of drawing data is received from an input device that is a touch enabled device.

11. The method of claim 10, further comprising:
detecting a touch input to the shape on the graphical user interface; and
moving the shape responsive to said detecting the touch input.

12. The method of claim 11, further comprising:
detecting an additional touch input to the shape on the graphical user interface; and
rotating the shape responsive to said detecting the additional touch input.

13. The method of claim 9, wherein the shape has a plurality of drag points enabling manipulation of the shape responsive to detecting input at one or more of the plurality of drag points.

14. The method of claim 9, further comprising:
displaying, at the graphical user interface, a modifier key; and
responsive to detecting input at the modifier key, snapping the shape to an angle.

15. The method of claim 9, further comprising displaying one or more moveable vanishing points for perspective drawing.

16. The method of claim 9, further comprising displaying a drawing support tool.

17. A system comprising:
a memory configured to maintain drawing data;
a display device configured to display a shape and a buffer region adjacent to an edge of the shape on a graphical user interface, the shape including a separate user interface on its surface displaying one or more selectable preset shapes; and
one or more processors to implement an edge detection module that is configured to:
receive, at the separate user interface, a selection of one of the one or more preset shapes;
responsive to receiving said selection, change the displayed shape to the selected one of the one or more preset shapes;
receive a set of the drawing data located within the buffer region;
determine a first subset of the drawing data located within a predetermined distance from the edge of the preset shape;
determine a second subset of the drawing data located at a distance that exceeds the predetermined distance;
initiate a display of the first subset of the drawing data;
prevent the second subset of the drawing data from being displayed at the distance that exceeds the predetermined distance;
initiate a display of the second subset of the drawing data repositioned within the predetermined distance; and
move the preset shape according to a hierarchy of connected shapes, the preset shape being a root shape connected to a child shape and the root shape dictates a movement behavior of the child shape.

18. The system of claim 17, wherein the edge detection module is configured to said receive the set of the drawing data via an input device that is a touch enabled device.

19. The system of claim 18, wherein the edge detection module is configured to move the shape responsive to detection of a touch input to the shape.

20. The system of claim 19, wherein the edge detection module is configured to rotate the shape responsive to detection of an additional touch input to the shape.

* * * * *